United States Patent
Radi et al.

(10) Patent No.: US 11,675,706 B2
(45) Date of Patent: Jun. 13, 2023

(54) DEVICES AND METHODS FOR FAILURE DETECTION AND RECOVERY FOR A DISTRIBUTED CACHE

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/916,730

(22) Filed: Jun. 30, 2020

(65) Prior Publication Data
US 2021/0406191 A1    Dec. 30, 2021

(51) Int. Cl.
| | | |
|---|---|---|
| *G06F 12/00* | (2006.01) | |
| *G06F 12/0895* | (2016.01) | |
| *G06F 12/0817* | (2016.01) | |
| *G06F 12/14* | (2006.01) | |
| *H04L 43/10* | (2022.01) | |
| *G06F 12/0891* | (2016.01) | |

(52) U.S. Cl.
CPC ...... *G06F 12/0895* (2013.01); *G06F 12/0824* (2013.01); *G06F 12/0891* (2013.01); *G06F 12/1458* (2013.01); *H04L 43/10* (2013.01); *G06F 2212/7209* (2013.01)

(58) Field of Classification Search
CPC ............. G06F 12/0895; G06F 12/0824; G06F 12/0891; G06F 12/1458; G06F 2212/7209; H04L 43/10
See application file for complete search history.

(56) References Cited

U.S. PATENT DOCUMENTS

| | | | | |
|---|---|---|---|---|
| 6,044,438 | A | * | 3/2000 | Olnowich ........... G06F 12/0813 |
| | | | | 711/E12.027 |
| 6,078,997 | A | | 6/2000 | Young et al. |
| 6,108,737 | A | | 8/2000 | Sharma et al. |
| 6,209,065 | B1 | | 3/2001 | Van Doren et al. |

(Continued)

FOREIGN PATENT DOCUMENTS

KR    102163279 B1    10/2020

OTHER PUBLICATIONS

Hashemi et al.; "Learning Memory Access Patters"; 15 pages; Mar. 6, 2018; available at https://arxiv.org/pdf/1803.02329.pdf.

(Continued)

*Primary Examiner* — Shawn X Gu
*Assistant Examiner* — Mohammad S Hasan
(74) *Attorney, Agent, or Firm* — Barry IP Law, P.C.

(57) ABSTRACT

A programmable switch includes at least one memory configured to store a cache directory for a distributed cache, and circuitry configured to receive a cache line request from a client device to obtain a cache line. The cache directory is updated based on the received cache line request, and the cache line request is sent to a memory device to obtain the requested cache line. An indication of the cache directory update is sent to a controller for the distributed cache to update a global cache directory. In one aspect, the controller sends at least one additional indication of the update to at least one other programmable switch to update at least one backup cache directory stored at the at least one other programmable switch.

22 Claims, 12 Drawing Sheets

(56) References Cited

U.S. PATENT DOCUMENTS

| | | | |
|---|---|---|---|
| 6,230,243 B1* | 5/2001 | Elko | G06F 12/0804 |
| | | | 711/E12.04 |
| 6,263,404 B1* | 7/2001 | Borkenhagen | G06F 9/383 |
| | | | 712/E9.055 |
| 6,298,418 B1 | 10/2001 | Fujiwara et al. | |
| 6,343,346 B1* | 1/2002 | Olnowich | G06F 12/0817 |
| | | | 711/E12.027 |
| 6,775,804 B1 | 8/2004 | Dawson | |
| 6,829,683 B1 | 12/2004 | Kuskin | |
| 6,868,439 B2 | 3/2005 | Basu et al. | |
| 6,954,844 B2 | 10/2005 | Lentz et al. | |
| 6,993,630 B1 | 1/2006 | Williams et al. | |
| 7,032,078 B2 | 4/2006 | Cypher et al. | |
| 7,376,799 B2 | 5/2008 | Veazey et al. | |
| 7,673,090 B2 | 3/2010 | Kaushik et al. | |
| 7,716,425 B1 | 5/2010 | Uysal et al. | |
| 7,975,025 B1 | 7/2011 | Szabo et al. | |
| 8,166,251 B2 | 4/2012 | Luttrell | |
| 8,281,075 B2 | 10/2012 | Arimilli et al. | |
| 9,088,592 B1 | 7/2015 | Craft et al. | |
| 9,313,604 B1 | 4/2016 | Holcombe | |
| 9,442,850 B1* | 9/2016 | Rangarajan | G06F 16/10 |
| 9,467,380 B2 | 10/2016 | Hong et al. | |
| 9,712,381 B1 | 7/2017 | Emanuel et al. | |
| 9,819,739 B2 | 11/2017 | Hussain et al. | |
| 9,825,862 B2 | 11/2017 | Bosshart | |
| 9,826,071 B2 | 11/2017 | Bosshart | |
| 9,880,768 B2 | 1/2018 | Bosshart | |
| 9,910,615 B2 | 3/2018 | Bosshart | |
| 9,912,610 B2 | 3/2018 | Bosshart et al. | |
| 9,923,816 B2 | 3/2018 | Kim et al. | |
| 9,936,024 B2 | 4/2018 | Malwankar et al. | |
| 9,940,056 B2 | 4/2018 | Bosshart | |
| 10,038,624 B1 | 7/2018 | Cruz et al. | |
| 10,044,583 B2 | 8/2018 | Kim et al. | |
| 10,050,854 B1 | 8/2018 | Licking et al. | |
| 10,063,407 B1 | 8/2018 | Kodeboyina et al. | |
| 10,063,479 B2 | 8/2018 | Kim et al. | |
| 10,063,638 B2 | 8/2018 | Huang | |
| 10,067,967 B1 | 9/2018 | Bosshart | |
| 10,075,567 B1 | 9/2018 | Licking et al. | |
| 10,078,463 B1 | 9/2018 | Bosshart | |
| 10,084,687 B1 | 9/2018 | Sharif et al. | |
| 10,110,454 B2 | 10/2018 | Kim et al. | |
| 10,127,983 B1 | 11/2018 | Peterson et al. | |
| 10,133,499 B2 | 11/2018 | Bosshart | |
| 10,146,527 B2 | 12/2018 | Olarig et al. | |
| 10,158,573 B1 | 12/2018 | Lee et al. | |
| 10,164,829 B1 | 12/2018 | Watson et al. | |
| 10,169,108 B2 | 1/2019 | Gou et al. | |
| 10,225,381 B1 | 3/2019 | Bosshart | |
| 10,230,810 B1 | 3/2019 | Bhide et al. | |
| 10,237,206 B1 | 3/2019 | Agrawal et al. | |
| 10,257,122 B1 | 4/2019 | Li et al. | |
| 10,268,634 B1 | 4/2019 | Bosshart et al. | |
| 10,298,456 B1 | 5/2019 | Chang | |
| 10,496,566 B2 | 12/2019 | Olarig et al. | |
| 10,628,353 B2 | 4/2020 | Prabhakar et al. | |
| 10,635,316 B2 | 4/2020 | Singh et al. | |
| 10,761,995 B2 | 9/2020 | Blaner et al. | |
| 10,812,388 B2 | 10/2020 | Thubert et al. | |
| 10,880,204 B1 | 12/2020 | Shalev et al. | |
| 2003/0009637 A1* | 1/2003 | Arimilli | G06F 12/0817 |
| | | | 711/E12.027 |
| 2003/0028819 A1* | 2/2003 | Chiu | G06F 11/2089 |
| | | | 714/5.11 |
| 2003/0158999 A1 | 8/2003 | Hauck et al. | |
| 2004/0044850 A1 | 3/2004 | George et al. | |
| 2004/0073699 A1* | 4/2004 | Hong | H04L 45/00 |
| | | | 709/253 |
| 2004/0260883 A1 | 12/2004 | Wallin et al. | |
| 2005/0058149 A1* | 3/2005 | Howe | H04L 49/602 |
| | | | 370/428 |
| 2006/0265568 A1* | 11/2006 | Burton | G06F 12/123 |
| | | | 711/216 |
| 2007/0067382 A1 | 3/2007 | Sun | |
| 2008/0010409 A1 | 1/2008 | Rao et al. | |
| 2009/0240664 A1* | 9/2009 | Dinker | G06F 12/0866 |
| 2009/0240869 A1* | 9/2009 | O'Krafka | G06F 12/0284 |
| | | | 710/316 |
| 2009/0313503 A1 | 12/2009 | Atluri et al. | |
| 2010/0008260 A1 | 1/2010 | Kim et al. | |
| 2010/0223322 A1* | 9/2010 | Mott | H04L 67/02 |
| | | | 709/203 |
| 2011/0004729 A1 | 1/2011 | Akkawi et al. | |
| 2011/0093925 A1 | 4/2011 | Krishnamoorthy et al. | |
| 2011/0238923 A1 | 9/2011 | Hooker et al. | |
| 2012/0110108 A1* | 5/2012 | Li | G06F 12/123 |
| | | | 709/213 |
| 2012/0155264 A1 | 6/2012 | Sharma et al. | |
| 2013/0254325 A1 | 9/2013 | Song et al. | |
| 2013/0263249 A1 | 10/2013 | Song et al. | |
| 2014/0219284 A1 | 8/2014 | Chau et al. | |
| 2014/0241361 A1 | 8/2014 | Bosshart et al. | |
| 2014/0269413 A1 | 9/2014 | Hui et al. | |
| 2014/0269716 A1 | 9/2014 | Pruss et al. | |
| 2014/0278575 A1 | 9/2014 | Anton et al. | |
| 2014/0331001 A1 | 11/2014 | Liu et al. | |
| 2014/0362709 A1 | 12/2014 | Kashyap et al. | |
| 2015/0195216 A1 | 7/2015 | Di Pietro et al. | |
| 2015/0301949 A1* | 10/2015 | Koka | G06F 12/0815 |
| | | | 711/147 |
| 2015/0319243 A1 | 11/2015 | Hussain et al. | |
| 2015/0378919 A1 | 12/2015 | Anantaraman et al. | |
| 2016/0050150 A1 | 2/2016 | Venkatesan et al. | |
| 2016/0099872 A1 | 4/2016 | Kim et al. | |
| 2016/0127492 A1 | 5/2016 | Malwankar et al. | |
| 2016/0156558 A1 | 6/2016 | Hong et al. | |
| 2016/0216913 A1 | 7/2016 | Bosshart | |
| 2016/0246507 A1 | 8/2016 | Bosshart | |
| 2016/0246535 A1 | 8/2016 | Bosshart | |
| 2016/0294451 A1 | 10/2016 | Jung et al. | |
| 2016/0315964 A1 | 10/2016 | Shetty et al. | |
| 2016/0323189 A1 | 11/2016 | Ahn et al. | |
| 2017/0026292 A1 | 1/2017 | Smith et al. | |
| 2017/0054618 A1 | 2/2017 | Kim | |
| 2017/0054619 A1 | 2/2017 | Kim | |
| 2017/0063690 A1 | 3/2017 | Bosshart | |
| 2017/0064047 A1 | 3/2017 | Bosshart | |
| 2017/0093707 A1 | 3/2017 | Kim et al. | |
| 2017/0093986 A1 | 3/2017 | Kim et al. | |
| 2017/0093987 A1 | 3/2017 | Kaushalram et al. | |
| 2017/0187846 A1 | 6/2017 | Shalev et al. | |
| 2017/0214599 A1 | 7/2017 | Seo et al. | |
| 2017/0286363 A1 | 10/2017 | Joshua et al. | |
| 2017/0371790 A1 | 12/2017 | Dwiel et al. | |
| 2018/0034740 A1 | 2/2018 | Beliveau et al. | |
| 2018/0060136 A1* | 3/2018 | Herdrich | G06F 9/5077 |
| 2018/0173448 A1 | 6/2018 | Bosshart | |
| 2018/0176324 A1 | 6/2018 | Kumar et al. | |
| 2018/0234340 A1 | 8/2018 | Kim et al. | |
| 2018/0234355 A1 | 8/2018 | Kim et al. | |
| 2018/0239551 A1 | 8/2018 | Bosshart | |
| 2018/0242191 A1 | 8/2018 | Lundqvist et al. | |
| 2018/0260330 A1 | 9/2018 | Felter et al. | |
| 2018/0262459 A1 | 9/2018 | Wang et al. | |
| 2018/0285275 A1 | 10/2018 | Barczak et al. | |
| 2018/0329818 A1 | 11/2018 | Cheng et al. | |
| 2018/0335953 A1 | 11/2018 | Ramaswamy et al. | |
| 2018/0337860 A1 | 11/2018 | Kim et al. | |
| 2018/0349163 A1 | 12/2018 | Gao et al. | |
| 2018/0349285 A1 | 12/2018 | Ish et al. | |
| 2019/0012278 A1 | 1/2019 | Sindhu et al. | |
| 2019/0044878 A1 | 2/2019 | Steffen et al. | |
| 2019/0050333 A1* | 2/2019 | Chacon | G06F 12/084 |
| 2019/0058646 A1 | 2/2019 | Kim et al. | |
| 2019/0087341 A1 | 3/2019 | Pugsley et al. | |
| 2019/0196987 A1 | 6/2019 | Shen et al. | |
| 2019/0220429 A1 | 7/2019 | Ranjan et al. | |
| 2019/0227921 A1 | 7/2019 | Frolikov | |
| 2019/0342785 A1 | 11/2019 | Li et al. | |
| 2019/0354402 A1 | 11/2019 | Bivens et al. | |

(56) References Cited

U.S. PATENT DOCUMENTS

| | | |
|---|---|---|
| 2019/0370176 A1 | 12/2019 | Priyadarshi et al. |
| 2019/0391928 A1 | 12/2019 | Lin |
| 2019/0394261 A1 | 12/2019 | DeCusatis et al. |
| 2020/0007408 A1 | 1/2020 | Siddappa |
| 2020/0065269 A1 | 2/2020 | Balasubramani et al. |
| 2020/0068014 A1 | 2/2020 | Sarkar et al. |
| 2020/0089619 A1 | 3/2020 | Hsu et al. |
| 2020/0097212 A1 | 3/2020 | Lakshman et al. |
| 2020/0151104 A1 | 5/2020 | Yang |
| 2020/0213156 A1 | 7/2020 | Cheng et al. |
| 2020/0226068 A1* | 7/2020 | Gellerich ............ G06F 12/0804 |
| 2020/0250099 A1* | 8/2020 | Campbell ........... G06F 12/0842 |
| 2020/0293499 A1* | 9/2020 | Kohli .................... G06F 3/0604 |
| 2020/0313999 A1 | 10/2020 | Lee et al. |
| 2020/0349080 A1 | 11/2020 | Radi et al. |
| 2020/0379668 A1 | 12/2020 | Akaike et al. |
| 2021/0034250 A1 | 2/2021 | Mizuno et al. |
| 2021/0034270 A1 | 2/2021 | Gupta et al. |
| 2021/0049078 A1 | 2/2021 | Khan et al. |
| 2021/0051751 A1 | 2/2021 | Pawar |
| 2021/0073086 A1 | 3/2021 | Subraya et al. |
| 2021/0149807 A1* | 5/2021 | Gupta ..................... G06F 3/061 |
| 2021/0173589 A1 | 6/2021 | Benisty et al. |
| 2021/0194828 A1 | 6/2021 | He et al. |
| 2021/0218623 A1 | 7/2021 | Jain et al. |
| 2021/0247935 A1 | 8/2021 | Beygi et al. |
| 2021/0266219 A1 | 8/2021 | Kim et al. |
| 2021/0294506 A1 | 9/2021 | Tadokoro |
| 2021/0318828 A1 | 10/2021 | Valtonen |

OTHER PUBLICATIONS

Kim, et al.; "A Framework for Data Prefetching using Off-line Training of Markovian Predictors"; Sep. 18, 2002; 8 pages; available at https://www.comp.nus.edu.sg/~wongwf/papers/ICCD2002.pdf.

Eisley et al.; "In-Network Cache Coherence"; 2006; pp. 321-332; Proceedings of the 39th Annual IEEE/ACM International Symposium on Microarchitecture.

Jin et al.; "NetCache: Balancing Key-Value Stores with Fast In-Network Caching"; Oct. 28, 2017; pp. 121-136; Proceedings of the 26th Symposium on Operating Systems Principles.

Li et al.; "Pegasus: Load-Aware Selective Replication with an In-Network Coherence Directory"; Dec. 2018; 15 pages; Technical Report UW-CSE-18-12-01, University of Washington CSE, Seattle, WA.

Liu et al.; "IncBricks: Toward In-Network Computation with an In-Network Cache"; Apr. 2017; pp. 795-809; ACM SIGOPS Operating Systems Review 51, Jul. 26, No. 2.

Pending U.S. Appl. No. 16/697,019, filed Nov. 26, 2019, entitled "Fault Tolerant Data Coherence in Large-Scale Distributed Cache Systems", Marjan Radi et al.

Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.

Pending U.S. Appl. No. 16/548,116, filed Aug. 22, 2019, entitled "Distributed Cache With In-Network Prefetch", Marjan Radi et al.

Written Opinion dated Feb. 20, 2020 from International Application No. PCT/US2019/068360, 4 pages.

Botelho et al.; "On the Design of Practical Fault-Tolerant SDN Controllers"; Sep. 2014; 6 pages; available at: http://www.di.fc.ul.pt/~bessani/publications/ewsdn14-ftcontroller.pdf.

Huynh Tu Dang; "Consensus Protocols Exploiting Network Programmability"; Mar. 2019; 154 pages; available at: https://doc.rero.ch/record/324312/files/2019INFO003.pdf.

Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1 &isAllowed=y.

Liu et al.; "Circuit Switching Under the Radar with REACToR"; Apr. 2-4, 2014; 16 pages; USENIX; available at: https://www.usenix.org/system/files/conference/nsdi14/nsdi14-paper-liu_he.pdf.

Ivan Pepelnjak; Introduction to 802.1Qbb (Priority-based Flow Control—PFC); accessed on Jun. 25, 2020; available at: https://gestaltit.com/syndicated/ivan/introduction-802-1qbb-priority-based-flow-control-pfc/.

Juniper Networks Inc.; Configuring Priority-Based Flow Control for an EX Series Switch (CLI Procedure); Sep. 25, 2019; available at: https://www.juniper.net/documentation/en_US/junos/topics/task/configuration/cos-priority-flow-control-cli-ex-series.html.

Pending U.S. Appl. No. 16/914,206, filed Jun. 26, 2020, entitled "Devices and Methods for Managing Network Traffic for a Distributed Cache", Marjan Radi et al.

Wikipedia; Paxos (computer science); accessed on Jun. 27, 2020; available at: https://en.wikipedia.org/wiki/Paxos_(computer_science).

Paul Krzyzanowski; "Understanding Paxos"; PK.org; Distributed Systems; Nov. 1, 2018; available at: https://www.cs.rutgers.edu/~pxk/417/notes/paxos.html.

Leslie Lamport; "Paxos Made Simple"; Nov. 1, 2001; available at: https://lamport.azurewebsites.net/pubs/paxos-simple.pdf.

Written Opinion dated Apr. 27, 2020 from International Application No. PCT/US2019/068269, 3 pages.

Disco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.

Pending U.S. Appl. No. 17/174,681, filed Feb. 12, 2021, entitled "Devices and Methods for Network Message Sequencing", Marjan Radi et al.

Pending U.S. Appl. No. 17,175,449, filed Feb. 12, 2021, entitled "Management of Non-Volatile Memory Express Nodes", Marjan Radi et al.

Ibrar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.

Saif et al.; "IOscope: A Flexible I/O Tracer for Workloads' I/O Pattern Characterization"; Jan. 25, 2019; International Conference on High Performance Computing; available at https://doi.org/10.1007/978-3-030-02465-9_7.

Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.

Pending U.S. Appl. No. 17/353,781, filed Jun. 21, 2021, entitled "In-Network Failure Indication and Recovery", Marjan Radi et al.

Pending U.S. Appl. No. 17/331,453, filed May 26, 2021, entitled "Distributed Cache Management", Marjan Radi et al.

Stefanovici et al.; "Software-Defined Caching: Managing Caches in Multi-Tenant Data Centers"; Aug. 2015; pp. 174-181; SoCC '15: Proceedings of the Sixth ACM Symposium on Cloud Computing; available at: http://dx.doi.org/10.1145/2806777.2806933.

Mahmood et al.; "Efficient Caching through Stateful SDN in Named Data Networking"; Dec. 14, 2017; Transactions on Emerging Telecommunications Technologies; vol. 29, issue 1; available at: https://onlinelibrary.wiley.com/doi/abs/10.1002/ett.3271.

Liu et al.; "DistCache: Provable Load Balancing for Large-Scale Storage Systems with Distributed Caching"; Feb. 2019; Proceedings of the 17th USENIX Conference on File and Storage Technologies; available at: https://www.usenix.org/conference/fast19/presentation/liu.

International Search Report and Written Opinion dated Oct. 28, 2021 from International Application No. PCT/US2021/039070, 7 pages.

Liu et al.; "DistCache: provable load balancing for large-scale storage systems with distributed caching"; FAST '19: Proceedings of the 17th USENIX Conference on File and Storage Technologies; Feb. 2019; pp. 143-157 (Year 2019).

Radi et al.; "OmniXtend: direct to caches over commodity fabric"; 2019 IEEE Symposium on High-Performance Interconnects (HOTI); Santa Clara, CA; Aug. 2019; pp. 59-62 (Year 2019).

(56) References Cited

OTHER PUBLICATIONS

Wang et al.; "Concordia: Distributed Shared Memory with In-Network Cache Coherence"; 19th USENIX Conference on File and Storage Technologies; pp. 277-292; Feb. 2021.

International Search Report and Written Opinion dated Jun. 1, 2022 from International Application No. PCT/US2022/017608, 7 pages.

Intel Corporation; "In-Band Network Telemetry Detects Network Performance Issues"; White Paper, Dec. 18, 2020; available at: https://buildersintel.com/docs/networkbuilders/in-band-network-telemetry-detects-network-performance-issues.pdf.

International Search Report and Written Opinion dated Jul. 7, 2022 from International Application No. PCT/US2022/017633, 7 pages.

Sabella et al.; "Using eBPF for network traffic analysis"; available at: Year: 2018; https://www.ntop.org/wp-content/uploads/2018/10/Sabella.pdf.

Wikipedia; "Multistage interconnection networks"; accessed on Sep. 21, 22; available at: https://en.wikipedia.org/wiki/Multistage_interconnection_networks.

Lysne et al.; "Networks, Multistage"; Encyclopedia of Parallel Computing; p. 1316-1321; Year 2011; available at: https://link.springer.com/referenceworkentry/10.1007/978-0-387-09766-4_317.

\* cited by examiner

| Layer | Preamble | Start Of Frame Delimiter | MAC Destination | MAC Source | 802.1Q Tag | Ethertype or Length | Payload | | | Frame Check Sequence | Interpacket Gap |
|---|---|---|---|---|---|---|---|---|---|---|---|
| Size | 7 Bytes | 1 Byte | 6 Bytes | 6 Bytes | 4 Bytes | 2 Bytes | 4 Bytes | 4 Bytes | 38-1500 Bytes | 4 Bytes | 12 Bytes |
| 2 | | | | | 60 | | 62 | 64 | | | |
| 1 | | | | | | | | | | | |
FIG. 6A
FIG. 6B
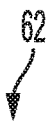
FIG. 6C

DEVICES AND METHODS FOR FAILURE DETECTION AND RECOVERY FOR A DISTRIBUTED CACHE

CROSS-REFERENCE TO RELATED APPLICATIONS

This application is related to U.S. application Ser. No. 16/548,116 titled "DISTRIBUTED CACHE WITH IN-NETWORK PREFETCH", filed on Aug. 22, 2019, which is hereby incorporated by reference in its entirety. This application is also related to U.S. application Ser. No. 16/697,019 titled "FAULT TOLERANT DATA COHERENCE IN LARGE-SCALE DISTRIBUTED CACHE SYSTEMS", filed on Nov. 26, 2019, which is hereby incorporated by reference in its entirety. This application is also related to U.S. application Ser. No. 16/914,206 titled "DEVICES AND METHODS FOR MANAGING NETWORK TRAFFIC FOR A DISTRIBUTED CACHE", filed on Jun. 26, 2020, which is hereby incorporated by reference in its entirety.

BACKGROUND

Although more recent, high-performance networking may enable distributed caching systems in data centers, challenges remain to provide a fault-tolerant and coherent system for large-scale distributed caches. Replication is often used in distributed systems to provide fault tolerance for hardware failures. However, when using cache directory replicas for fault tolerance, synchronizing replicas can prove very difficult, especially for the growing size of today's data centers. In addition, the complexity of a coherency protocol can affect system performance. Since cache coherence operations typically depend on the cache directory, enabling a relatively fast consensus between cache directory replicas is important for such fault tolerance techniques in distributed caches to provide for quick recovery.

Accordingly, there is a need for a fault-tolerant and coherent system for large-scale distributed caches. In this regard, there is a need for systems that support fault-tolerant and consistent directory-based cache coherence over fabrics, such as Ethernet, for distributed caches, without significantly compromising system performance.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 6A depicts an example Ethernet packet format according to one or more embodiments.

FIG. 6B depicts an example 802.1Q tag format in the Ethernet packet format of FIG. 6A according to one or more embodiments.

FIG. 6C depicts an example custom header format for the Ethernet packet format of FIG. 6A according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Distributed Cache Examples

Figure 1:
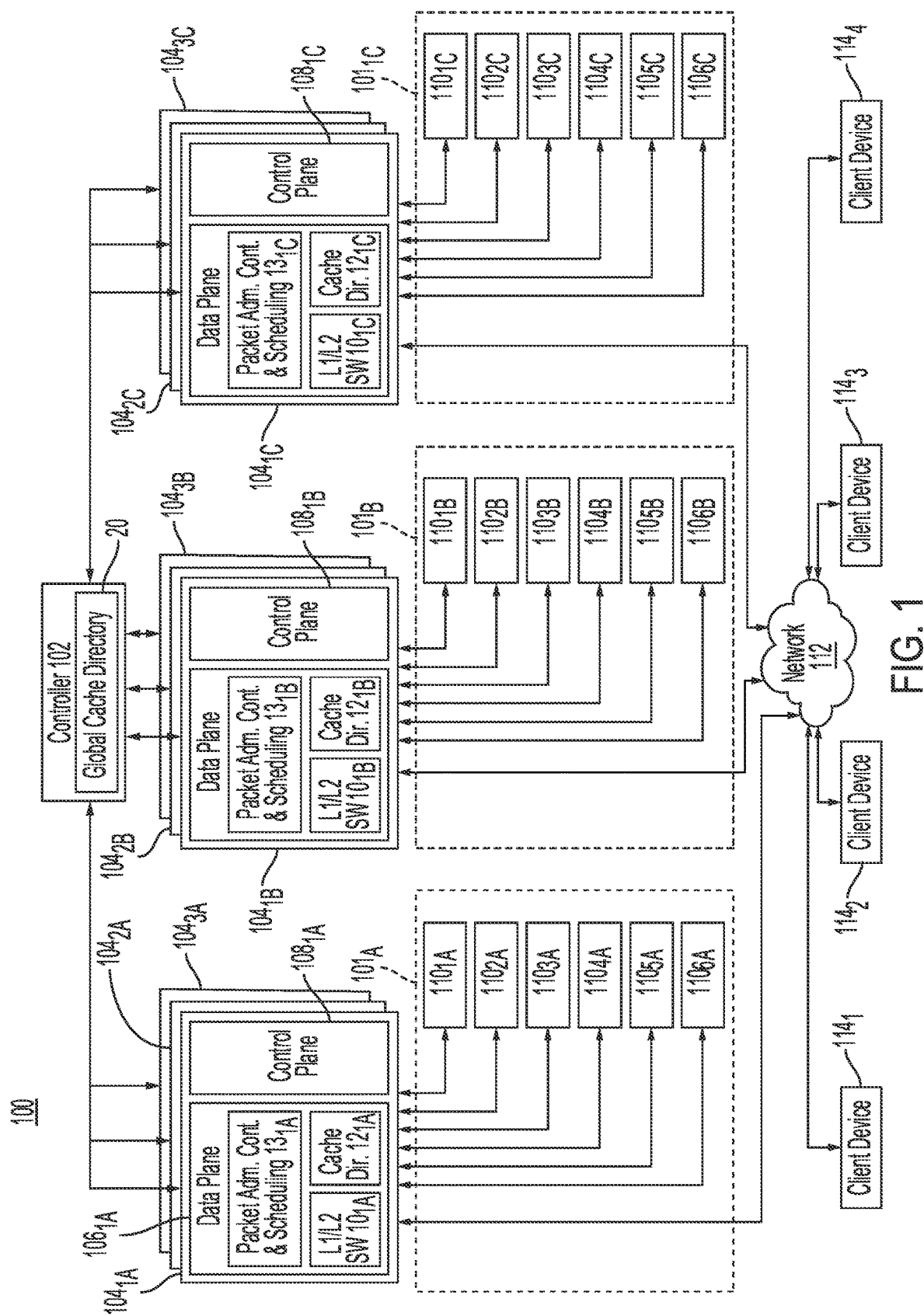
FIG. 1 illustrates a system environment for implementing a distributed cache according to one or more embodiments.

FIG. 1 illustrates an example system environment for implementing a distributed cache according to one or more embodiments. As shown in FIG. 1, client devices $114_1$, $114_2$, $114_3$, and $114_4$, and server racks $101_A$, $101_B$, and $101_C$ are connected to network 112 in system 100. Client devices 114 can include, for example, servers or processing nodes on network 112, such as Reduced Instruction Set Computer (RISC)-V cores, that share memory devices 110 of server racks 101 for use as an external main memory of the client devices 114. In this regard, data stored in or retrieved from memory devices 110 can include byte-addressable data (i.e., cache lines) to be loaded into a local main memory or processor cache (e.g., L1, L2, or L3 cache) of a client device 114. In some implementations, the system environment of FIG. 1 may be used as part of a data center and/or for distributed processing, such as for distributed machine learning or big data analysis.

Network 112 can include, for example, a Storage Area Network (SAN), a Local Area Network (LAN), and/or a Wide Area Network (WAN), such as the Internet. In this regard, one or more of client devices 114, controller 102, and/or one or more of server racks 101 may not be physically co-located. Server racks 101, controller 102, and client devices 114 may communicate using one or more standards such as, for example, Ethernet, Fibre Channel, and/or Infini-Band.

As shown in the example of FIG. 1, each of server racks $101_A$, $101_B$, and $101_C$ is connected to three programmable switches, and includes six memory devices 110. Programmable switches 104 may, for example, serve as Top of Rack (ToR) switches or edge switches for their respective server racks 101. In the example of FIG. 1, each server rack 101 includes a primary programmable switch 104 (e.g., programmable switch $104_{1A}$ for rack $101_A$) in addition to two secondary or backup programmable switches (e.g., programmable switches $104_{2A}$ and $104_{3A}$ for rack $101_A$). As discussed in more detail below, each of the programmable switches 104 for a rack 101 stores its own copy of a cache directory, such as cache directory $12_{1A}$ stored at programmable switch $104_{1A}$, for the cache lines stored in the memory devices 110 of the rack 101. In other implementations, each server rack 101 may only include a single backup programmable switch 104 for redundancy. In some other implementations, aggregated switches in the data center network may store backup cache directories to provide fault tolerance.

Controller 102 communicates with each of the programmable switches 104 in system 100. In some implementations, controller 102 can include a Software Defined Networking (SDN) controller. As discussed in more detail below, controller 102 maintains global cache directory 20 for coherence in the permissions and states of cache lines stored in the distributed cache based on directory updates received from programmable switches 104. In addition, and as discussed in more detail in related application Ser. No. 16/914,206 incorporated by reference above, controller 102 in some implementations can manage network traffic for system 100 with the use of programmable switches 104 based on information provided to controller 102 from programmable switches 104.

Those of ordinary skill in the art will appreciate with reference to the present disclosure that other implementations may include a different number or arrangement of memory devices 110, programmable switches 104, or server racks 101 than shown in the example of FIG. 1. In this regard, system 100 shown in FIG. 1 is for the purposes of illustration, and those of ordinary skill in the art will appreciate that system 100 may include many more memory devices 110, racks 101, client devices 114, and programmable switches 104 than shown in the example of FIG. 1.

Programmable switches 104 are configured to route cache messages, such as cache line requests, and other communications between client devices 114 and memory devices 110. For example, such cache messages may include a get request or a put request for one or more cache lines, or a permission level request for a client device 114 to modify a cache line requested from a memory device 110. As discussed in more detail below with reference to FIGS. 5A to 5C and in co-pending application Ser. No. 16/697,019 incorporated by reference above, such permission levels can be used to maintain the coherency of data across devices in the system.

In some implementations, programmable switches 104 can include, for example, a switch that can be programmed to handle different custom protocols. As discussed in more detail below with reference to FIGS. 3A and 3B, programmable switches 104 can include programmable match-action pipelines to provide a configurable data plane and customized packet processing capability. Examples of such programmable switches can be found in co-pending U.S. application Ser. Nos. 16/548,116, 16/697,019, and 16/914,206, which are incorporated by reference above.

Data planes 106 of programmable switches 104 in the example of FIG. 1 can control point-to-point packet forwarding behavior of the programmable switch, such as with L1/L2 Ethernet packet switching modules 10 and packet admission control and scheduling modules 13. In addition, data planes 106 include local cache directories 12 that can be updated by programmable switches 104 to maintain data coherency of cache lines stored in memory devices 110. Each cache directory 12 can track modifications and storage locations for a given cache line stored in a memory device 110 housed in the server rack 101 corresponding to the programmable switch 104.

Data planes 106 of programmable switches 104 are programmable and separate from higher-level control planes 108 that determine end-to-end routes for packets between devices in system 100. In this regard, control planes 108 may be used for handling different processes, such as the processes in FIGS. 8 and 9 discussed in more detail below.

In one example, programmable switches 104 can be 64 port ToR P4 programmable switches, such as a Barefoot Networks Tofino Application Specific Integrated Circuit (ASIC) with ports configured to provide 40 Gigabit Ethernet (GE) frame rates. Other types of programmable switches that can be used as a programmable switch 104 can include, for example, a Cavium Xpliant programmable switch or a Broadcom Trident 3 programmable switch.

The use of a programmable switch allows for the configuration of high-performance and scalable memory centric architectures by defining customized packet formats and processing behavior, such as those discussed below with reference to FIGS. 6A to 6C. Programmable switches 104 also allow for a protocol-independent switch architecture and the use of off-the-shelf switches, as opposed to specially designed Networks on a Chip (NoCs), for coherence of data across system 100.

Controller 102 using global cache directory 20 can provide coherency among the cache directories 12 stored at the programmable switches 104 in system 100. In some implementations, controller 102 can send indications of updates to backup programmable switches 104 to update replica or backup directories based on an indication of an update to a primary directory of a primary programmable switch 104 that is received by controller 102. In the example of FIG. 1, programmable switches $104_{1A}$, $104_{1B}$, and $104_{1C}$ serve as primary programmable switches for racks $101_A$, $101_B$, and $101_C$, respectively. Programmable switches $104_{2A}$, $104_{3A}$, $104_{2B}$, $104_{2C}$, and $104_{3C}$ serve as backup programmable switches for their respective racks 101, and maintain backup cache directories.

As discussed in more detail below with reference to the sequence diagram of FIG. 10, controller 102 may also provide a timestamp or directory version consensus among a primary cache directory and backup cache directories. This can ordinarily improve the coherence of the primary cache directory, global cache directory 20 maintained by controller 102, and the backup cache directories.

In addition, controller 102 may also proactively detect the failure or unavailability of primary programmable switches $104_1$ (e.g., primary programmable switches $104_{1A}$, $104_{1B}$, $104_{1C}$) and the associated unavailability of their respective primary cache directories $12_1$ (e.g., primary cache directories $12_{1A}$, $12_{1B}$, $12_{1C}$) by sending heartbeat packets to the primary programmable switches $104_1$. Controller 102 can then set a backup programmable switch to become a new primary programmable switch to provide for a quicker recovery, as compared to conventional distributed caches. For example, if a response to a heartbeat packet is not received from primary programmable switch $104_{1A}$, controller 102 may set backup programmable switch $104_{2A}$ as the new primary programmable switch for rack $101_A$.

Programmable switches 104 can use timeout values when sending indications of cache directory updates to controller 102. If an acknowledgment of the cache directory update is not received by the programmable switch 104 within the timeout value, the programmable switch 104 resends the indication of the cache directory update to controller 102 to ensure that global cache directory 20 is updated. In some implementations, the primary programmable switches $104_1$ can use mirroring of its cache directory updates to controller 102 in the background to reduce software overhead that may otherwise be needed in updating a global cache directory. In addition, the processing resources of programmable switches 104, such as the use of Content Addressable Memory (CAM) or Ternary CAM (TCAM) tables, or other types of match-action tables, can ordinarily provide faster processing of such cache directory updates than can occur at the end points of a client device 114 or a memory device 110.

In this regard, each programmable switch 104 can provide centralized data coherency management for the data stored in the memory devices 110 of its respective server rack 101. As discussed in more detail below, each programmable switch 104 can efficiently update a local cache directory 12 for memory devices 110 that it communicates with as cache line requests are received by the programmable switch 104. The limitation of cache directory 12 to the memory devices 110 that communicate with the programmable switch 104 can also improve the scalability of the distributed cache or the ability to expand the size of the distributed cache to new memory devices, such as by adding a new server rack with its own programmable switches and memory devices.

In some implementations, programmable switches 104 may further improve scalability by temporarily assigning logical identifiers to respective active client devices 114 that have requested cache lines, and removing the logical identifiers after the client devices become inactive. By only keeping track of the states or permission levels of active client devices 114 (e.g., the client devices 114 that retain a permission level for one or more cache lines), it is ordinarily possible to reduce the amount of memory needed at programmable switches 104 to store cache directories 12.

In the example of FIG. 1, memory devices 110 can include, for example, Storage Class Memories (SCMs) or other types of memory, such as Dynamic Random Access Memory (DRAM) or Static RAM (SRAM), that can store and retrieve data at a byte-addressable size or cache line size, as opposed to a page or block size, as in storage devices such as Solid-State Drives (SSDs) or Hard Disk Drives (HDDs). SCMs can include, for example, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory. Recently developed SCMs can provide non-volatile storage with a fine granularity of access (i.e., byte-addressable or cache line level) and a shorter data access latency, as compared to storage devices, such as an SSD using conventional flash memory or an HDD using a rotating magnetic disk. However, in some implementations, memories such as flash memory, HDDs, other types of storage may be used by memory devices 110 for the distributed cache.

As will be appreciated by those of ordinary skill in the art with reference to the present disclosure, system 100 may include additional devices or a different number of devices than shown in the example of FIG. 1. For example, some implementations may include a different number of client devices 114, racks 101, switches 104, controllers 102, or memory devices 110. In this regard, client devices 114 in some implementations may be located in one or more of racks 101 or in separate racks.

Figure 2:
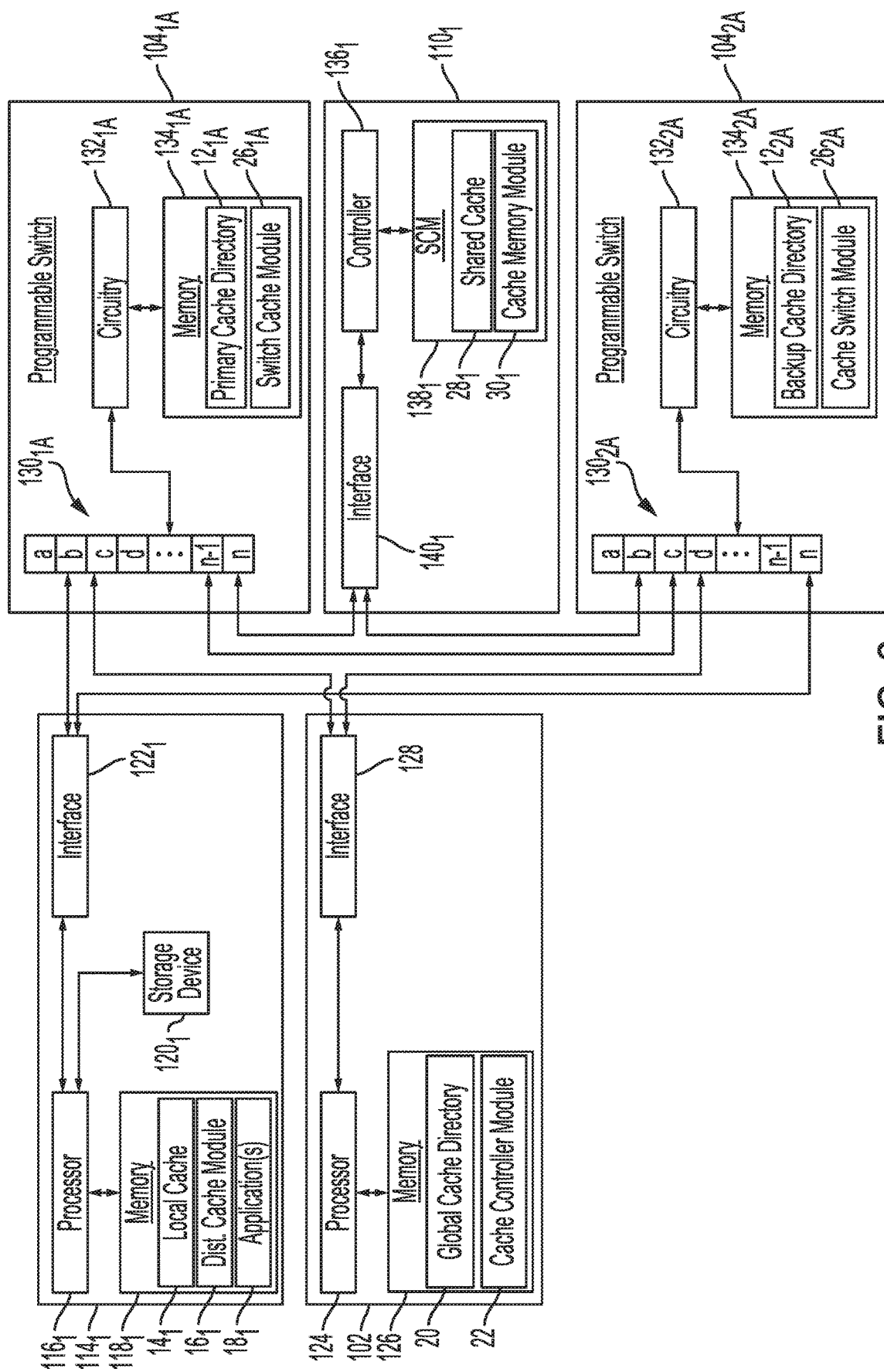
FIG. 2 is a block diagram of example components included in the system environment of FIG. 1 according to one or more embodiments.

FIG. 2 is a block diagram of example components included in system 100 of FIG. 1 according to one or more embodiments. As shown in FIG. 2, client device $114_1$ includes processor $116_1$, memory $118_1$, storage device $120_1$, and interface $122_1$ for communicating on network 112. Although only client device $114_1$ is shown in the example of FIG. 2, client devices $114_2$, $114_3$, and $114_4$ from FIG. 1 may have similar or different components as client device $114_1$.

Processor $116_1$ can execute instructions, such as instructions from distributed cache module $16_1$, and application(s) $18_1$, which may include an Operating System (OS) and/or other applications used by client device $114_1$. Processor $116_1$ can include circuitry such as a Central Processing Unit (CPU), a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor $116_1$ can include a System on a Chip (SoC), which may be combined with one or both of memory $118_1$ and interface $122_1$. Processor $116_1$ can include one or more cache levels (e.g., L1, L2, and/or L3 caches) where data is loaded from or flushed into memory $118_1$, or loaded from or flushed into memory devices 110, such as memory device $110_1$ in FIG. 2, via programmable switch $104_{1A}$ or programmable switch $104_{2A}$. Such data can include, for example, portions of code and related data being processed by processor $116_1$. The data accessed by processor $116_1$ is referred to herein as cache lines that may have a particular cache line size, such as 64 bytes, for example.

Memory $118_1$ can include, for example, a volatile RAM such as SRAM, DRAM, a non-volatile RAM, or other solid-state memory that is used by processor $116_1$ as an internal main memory to store data. Data stored in memory $118_1$ can include data read from storage device $120_1$, data to be stored in storage device $120_1$, instructions loaded from distributed cache module $16_1$ or application(s) $18_1$ for execution by processor $116_1$, and/or data used in executing such applications. In addition to loading data from internal main memory $118_1$, processor $116_1$ also loads data from memory devices 110 as an external main memory or distributed cache. Such data may also be flushed after modification by processor $116_1$ or evicted without modification back into internal main memory $118_1$ or an external main memory device 110 via programmable switch $104_{1A}$ or programmable switch $104_{2A}$.

As shown in FIG. 2, memory $118_1$ stores distributed cache module $16_1$, which can provide instructions for retrieving, storing, or maintaining coherency of cache lines stored in memory devices 110 in system 100. Such instructions can include a protocol for maintaining coherency of data (e.g., cache lines) stored on different devices of system 100 and handling communications with programmable switches 104. In some implementations, distributed cache module $16_1$ can include a driver used by an OS of client device $114_1$.

Storage device $120_1$ serves as secondary storage that can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof. As noted above internal main memory $118_1$ and external memory devices 110 typically provide faster data access and can provide more granular data access (e.g., cache line size or byte-addressable) than storage device $120_1$.

Interface $122_1$ is configured to interface client device $114_1$ with devices in system 100, such as programmable switches 104A and 104B. Interface $122_1$ may communicate using a standard such as, for example, Ethernet, Fibre Channel, or InfiniBand. In this regard, client device $114_1$, programmable switches 104A and 104B, controller 102, and memory device $110_1$ may not be physically co-located and may communicate over a network such as a LAN or a WAN. As will be appreciated by those of ordinary skill in the art, interface $122_1$ can be included as part of processor $116_1$.

Programmable switches $104_{1A}$ and $104_{2A}$ in some implementations can be ToR switches for server rack $101_A$ including memory device $110_1$. In the example of FIG. 2, programmable switches $104_{1A}$ and $104_{2A}$ include ports $130_{1A}$ and $130_{2A}$, respectively, circuitry $132_{1A}$ and $132_{2A}$, respectively, and memories $134_{1A}$ and $134_{2A}$, respectively. Ports 130 provide a connection and are configured to communicate with devices, such as client devices 114 in FIG. 1, controller 102, and memory devices 110 in server rack $101_A$. For example, ports 130 may include Ethernet, Fibre Channel, or InfiniBand ports. Circuitry $132_{1A}$ or $132_{2A}$ can include circuitry such an ASIC, a microcontroller, a DSP, an FPGA, hard-wired logic, analog circuitry and/or a combination thereof. In some implementations, circuitry $132_{1A}$ or $132_{2A}$ can include an SoC, which may be combined with memory $134_{1A}$ or memory $134_{2A}$, respectively.

Memory 134 of a programmable switch 104 can include, for example, a volatile RAM such as DRAM, or a non-volatile RAM or other solid-state memory such as register arrays that are used by circuitry 132 to execute instructions loaded from switch cache module 26 or firmware of the programmable switch 104, and/or data used in executing such instructions, such as primary cache directory $12_{1A}$ of programmable switch $104_{1A}$ or backup cache directory $12_{2A}$ of programmable switch $104_{2A}$. As discussed in more detail below, switch cache module 26 can include instructions for implementing processes such as those discussed with reference to FIGS. 8 and 9 below to maintain coherency of data in memory devices $110_{1A}$ to $110_{6A}$ using cache directory 12.

In the example of FIG. 2, programmable switch $104_{1A}$ can serve as a primary programmable switch, and programmable switch $104_{2A}$ can serve as a backup programmable switch. Controller 102 may designate or set particular programmable switches as the primary programmable switch for a rack 101. The primary programmable switch 104 (e.g., programmable switch $104_{1A}$ in FIG. 2) receives cache messages, such as cache line requests, from client devices 114 and routes the cache messages to an appropriate memory device 110 in the rack 101.

The other programmable switch or switches 104 for the rack 101 (e.g., programmable switches $104_{2A}$ and $104_{3A}$ in FIG. 1 for rack $101_A$) serve as a backup programmable switch or switches that may replace the primary programmable switch in the event that the primary programmable switch fails or otherwise becomes unavailable. In some implementations, the total number of programmable switches 104 for a rack 101 may follow a Paxos-based approach with 2n+1 programmable switches for fault tolerance and consensus among the remaining cache directories 12 when there are n failed programmable switches 104. In such an approach, three programmable switches 104 may be used for each rack 101 to provide fault tolerance and a remaining consensus in the event of one failed programmable switch 104.

As discussed in more detail below, controller 102 can ensure the ongoing consistency or coherence of the different cache directories 12 of the programmable switches 104 for the rack 101 so that the replacement of a primary programmable switch with a backup programmable switch is seamless without having to update the cache directory of the backup programmable switch before making the transition to a new primary programmable switch. By ensuring the ongoing consistency or coherency of the cache directories 12 for the programmable switches 104, it is ordinarily possible to provide for a quicker recovery after the failure or unavailability of the primary programmable switch since the backup directory 12 is already up to date.

In the example of FIG. 2, memory device $110_1$ includes SCM $138_1$ that allows cache lines to be retrieved from and stored in shared cache $28_1$ for use by client devices 114. Although shared cache $28_1$ is shown as being stored in an SCM, other implementations may include a different type of memory for storing shared cache $28_1$. As shown in FIG. 2, SCM $138_1$ also stores cache memory module $30_1$, which provides instructions for controller $136_1$ to implement cache coherency processes and a communication protocol for interfacing with programmable switches 104. Controller $136_1$ controls operation of memory device $110_1$, and can include circuitry such as a microcontroller, a DSP, an FPGA, an ASIC, hard-wired logic, analog circuitry and/or a combination thereof. In some implementations, controller $136_1$ can include an SoC, which may be combined with interface $140_1$, and/or SCM $138_1$. Interface $140_1$ is configured to interface with ports of programmable switches $104_{1A}$ and $104_{2A}$, and may interface according to a standard, such as Ethernet, Fibre Channel, or InfiniBand.

Controller 102 in the example of FIG. 2 maintains global cache directory 20. As discussed in more detail below with reference to FIGS. 7, 10 and 11, controller 102 receives cache directory updates from primary programmable switches $104_1$ via interface 128 indicating updates or changes to a primary cache directory $12_1$ maintained by the primary programmable switch $104_1$ (e.g., cache directories $12_{1A}$, $12_{1B}$ or $12_{1C}$ in FIG. 1). Controller 102 may then request a timestamp or version number of the backup cache directory 12 (e.g., backup cache directory $12_{2A}$ in FIG. 2) maintained by each of the backup programmable switches 104 (e.g., programmable switches $104_{2A}$ and $104_{3A}$ for rack $101_A$ in FIG. 1) associated with the primary programmable switch $104_1$ (e.g., primary programmable switch $104_{1A}$ for rack $101_A$ in FIG. 1). The timestamps or versions for the backup cache directories 12 may then be used by controller 102 to determine a new timestamp or version indicating a later version than the received timestamps or versions. Controller 102 may then send the new timestamp or version to the backup programmable switch or switches 104 with the indication of the cache directory update received from the primary programmable switch $104_1$.

Such a process can help controller 102 to verify that a backup programmable switch 104 is using a most recent version of a cache directory 12 as part of selecting a new primary programmable switch 104 and/or for ensuring cache directory coherence or consistency among the programmable switches 104 for a server rack 101. In addition, controller 102 can provide additional fault tolerance or redundancy with global cache directory 20 for cases where backup programmable switches 104 for a server rack 101 may not be available due to an error or loss of power, or may have differing information for their cache directories 12.

Processor 124 of controller 102 executes cache controller module 22 to maintain global cache directory 20 and update local cache directories 12 at programmable switches 104, as needed. In addition, processor 124 may also execute cache controller module 22 to send heartbeat packets to primary programmable switches $104_1$, and to set a backup programmable switch 1042 or 1043 to become a new primary programmable switch in response to a timeout value expiring for a response from a primary programmable switch $104_1$.

Processor 124 can include circuitry such as a CPU, a GPU, a microcontroller, a DSP, an ASIC, an FPGA, hardwired logic, analog circuitry and/or a combination thereof. In some implementations, processor 124 can include an SoC, which may be combined with one or both of memory 126 and interface 128. Memory 126 can include, for example, a volatile RAM such as DRAM, a non-volatile RAM, or other solid-state memory that is used by processor 124 to store data. Controller 102 communicates with programmable switches 104 via interface 128, which is configured to interface with ports of programmable switches 104, and may interface according to a standard, such as Ethernet, Fibre Channel, or InfiniBand.

As will be appreciated by those of ordinary skill in the art with reference to the present disclosure, other implementations may include a different arrangement or number of components, or modules than shown in the example of FIG. 2. For example, in some implementations, client device $114_1$ may not include storage device $120_1$, or SCM $138_1$ in memory device $110_1$ may be replaced by a DRAM.

Figure 3A:
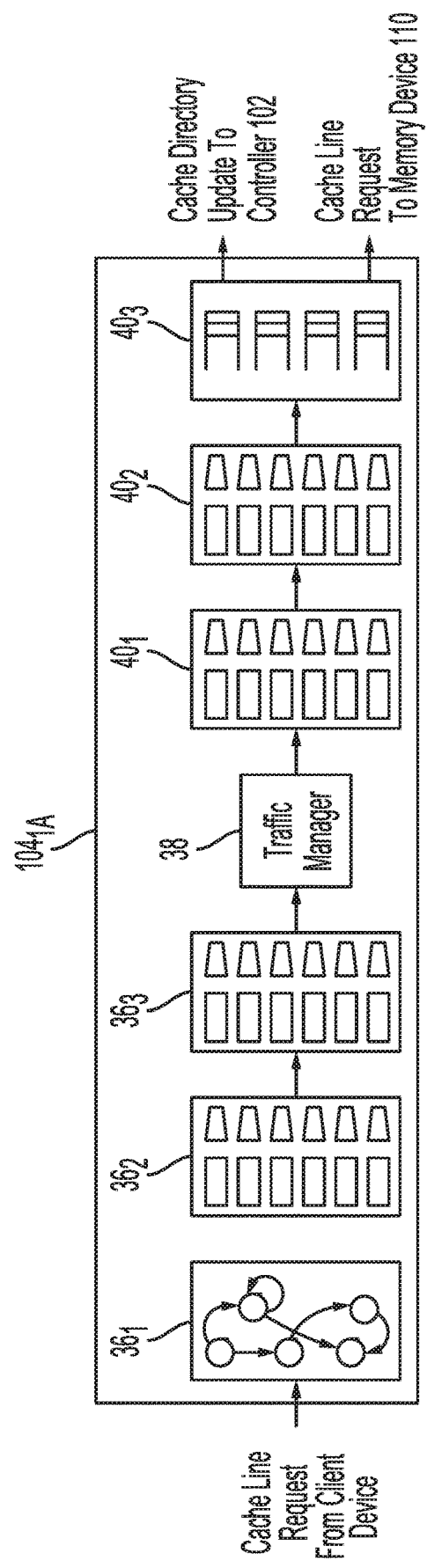
FIG. 3A illustrates example modules in a pipeline of a programmable switch according to one or more embodiments.

FIG. 3A depicts example modules in a pipeline of programmable switch $104_{1A}$ according to one or more embodiments. As shown in FIG. 3A, the pipeline for programmable switch $104_{1A}$ can include parser $36_1$, ingress stages $36_2$ and $36_3$, traffic manager 38, egress stages $40_1$ and $40_2$, and deparser $40_3$. Each of these modules may be programmed, such as by using P4, to handle a custom packet header and protocol. In addition, the example modules of programmable switch $104_{1A}$ shown in FIG. 3A can be implemented by circuitry $132_{1A}$ and memory $134_{1A}$ in FIG. 2, which is capable of parallel processing of packets in sequential stages.

In the example of FIG. 3A, a cache line request is received from a client device 114 as a cache message or packet by parser module $36_1$ of programmable switch $104_{1A}$. For its part, parser module $36_1$ is configured to extract packet headers and values from the packet headers, such as a destination address, operation type, or a source address, for match-action operations performed by the ingress and egress stages. In some implementations, parser $36_1$ may also extract priority indicators and cache request information from cache messages. As discussed in more detail in co-pending application Ser. No. 16/914,206 incorporated by reference above, the priority indicators may be used by programmable switch $104_{1A}$ to determine a queue for queuing a cache message, and the cache request information may indicate a cache usage of a client device 114 or memory device 110. The extracted values are fed into the ingress pipeline that includes stages $36_2$ and $36_3$.

As noted above, cache messages can have a custom packet format so that programmable switch $104_{1A}$ can distinguish cache messages, such as messages for cache line addressed data, from other network traffic, such as messages for page addressed data. The indication of a cache message, such as a cache line request to put or get cache line data, causes circuitry $132_{1A}$ of programmable switch $104_{1A}$ to handle the packet differently from other packets that are not indicated as being a cache message. In some implementations, the custom packet format fits into a standard 802.3 Layer 1 frame format, which can allow the packets to operate with existing and forthcoming programmable switches, such as a Barefoot Tofino ASIC switch, for example. In such an implementation, the preamble, start frame delimiter, and interpacket gap may follow the standard 802.3 Layer 1 frame format, but portions in Layer 2 are replaced with custom header fields that can be parsed by programmable switch $104_{1A}$. A payload of a packet for a cache message can include one or more memory addresses for one or more cache lines being requested by a client device or being returned to a client device, and may include data for the cache line or lines.

Stages $36_2$ and $36_3$ can include, for example programmable Arithmetic Logic Units (ALUs) and one or more memories that store match-action tables for matching extracted values from the headers and performing different corresponding actions based on the values, such as performing particular updates to cache directory $12_{1A}$ stored in memory $134_{1A}$ of programmable switch $104_{1A}$. In some implementations, stages $36_2$ and $36_3$ may use CAM or TCAM to quickly identify ports $130_{1A}$ associated with a destination address extracted from the packet by parser $36_1$. In some implementations, the stages of the ingress pipeline and the egress pipeline may share a single memory, such as memory $134_{1A}$ in FIG. 2. The matches and corresponding actions are made according to predefined rules and the extracted packet header values.

Traffic manager 38 routes the cache message (e.g., a cache line request) to an appropriate port of programmable switch $104_{1A}$. As discussed in more detail in co-pending application Ser. No. 16/548,116 incorporated by reference above, the ingress pipeline in some implementations may calculate offsets for additional cache lines to be prefetched based on the parsed header fields, and then generate corresponding additional cache line request packets using a packet generation engine of programmable switch $104_{1A}$.

In the example of FIG. 3A, the egress pipeline includes stages $40_1$ and $40_2$ that can each include ALUs and memories or portions of memory $134_{1A}$ that can be used for performing additional match-actions for an outgoing cache message. The frames are then assembled in packets by deparser $40_3$ for the outbound cache messages before leaving programmable switch $104_{1A}$ by, for example, merging processed headers and a payload.

As will be appreciated by those of ordinary skill in the art with reference to the present disclosure, other implementations may include a different arrangement of modules for a programmable switch. For example, other implementations may include more or less stages as part of the ingress or egress pipeline.

Figure 3B:
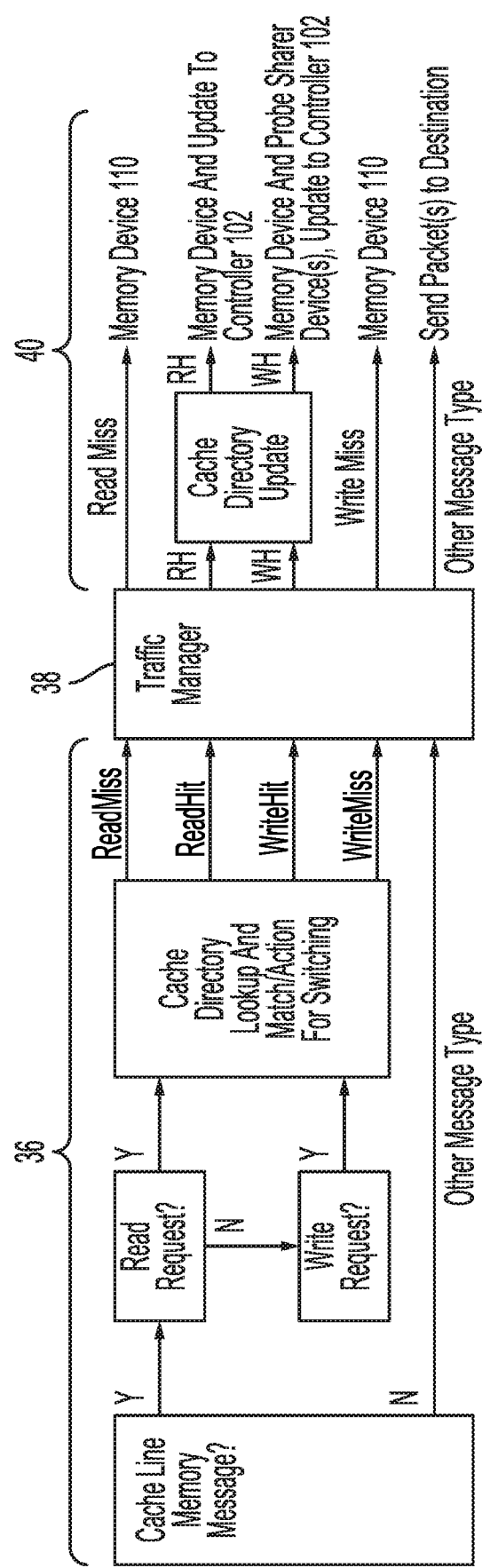
FIG. 3B illustrates example operations performed by the modules of FIG. 3A according to one or more embodiments.

FIG. 3B illustrates example operations performed by the modules of FIG. 3A according to one or more embodiments. As shown in FIG. 3B, ingress pipeline 36, including parser $36_1$ and ingress stages $36_2$ and $36_3$, determines whether incoming messages are cache messages for a distributed cache stored in memory devices 110. In some implementations parser $36_1$ may extract a header from the incoming message and an ingress stage may compare a value in the header indicating that the message is a cache message intended for the distributed cache.

If the incoming message is a cache message, such as a get or a put cache line request to retrieve or store a cache line, respectively, ingress pipeline 36 can determine whether the cache message is a read request, a write request, or other type of cache message, such as a cache coherency message. As discussed in the example header format of FIG. 6C, a field in the header can indicate an operation code indicating an operation, such as a read or write operation, that a device sending a cache line request intends to perform on requested data. Ingress pipeline 36 performs a lookup operation in the cache directory 12 stored at the programmable switch 104 to identify a memory device 110 storing the requested cache line. If an address for the cache line is already in cache directory 12, the cache line request is treated as a read hit or a write hit depending on the operation code. If the address for the cache line is not in cache directory 12, the cache line request is treated as a read miss or a write miss depending on the operation code.

If the incoming message is not a cache message, such as a read or write command in units greater than a cache line size (e.g., in a page or block size), the message or portions of the message, such as a header and a payload, are passed to traffic manager 38, which can determine a port 130 for sending the message. In some implementations, a destination address in the header can indicate a port 130 to send the message via egress pipeline 40, which may reassemble the message before sending the message to another device in system 100.

In the case where the incoming message is a cache line request, match-action tables of one or more of stages $36_2$ and $36_3$ may be used to determine a memory device 110 storing the requested cache line or cache lines. In this regard, and as discussed in more detail in co-pending application Ser. No. 16/697,019 incorporated by reference above, the memory device 110 may serve as a home node or serialization point for the cache lines it stores by allowing access and granting permission levels for modification of the cache lines to other nodes or devices in system 100. Traffic manager 38 can determine a port 130 for sending the cache line request to the identified memory device 110 storing the requested cache line.

In the cases of a read miss or a write miss, egress pipeline 40 including deparser $40_3$ reassembles or builds one or more packets for the cache line request and sends it to the identified memory device 110. Ingress pipeline 36 may determine that a requested cache line or a cache line to be written is not currently represented in the cache directory 12 stored at programmable switch 104. In such cases, circuitry 132 of programmable switch 140 can update its cache directory 12 after receiving the requested cache line from a memory device 110 or after receiving a confirmation from a memory device 110 that the cache line has been written. Programmable switch 104 then sends an indication of the cache directory update to controller 102 to update global cache directory 20 to account for the addition of the new cache line in cache directory 12.

In the cases of a read hit or a write hit, one or more of egress stages $40_1$ and $40_2$ may be used to update cache directory 12. In some examples, a status or permission level, and/or a version number may be changed in cache directory 12 for an entry corresponding to the requested cache line. The read request may be reassembled or built by deparser $40_3$, and sent to the identified memory device 110 storing the requested data.

As discussed in more detail below with reference to the sequence diagram of FIG. 7 and the process of FIG. 8, egress pipeline 40 also sends an indication of the cache directory update to controller 102 to update global cache directory 20. In some cases, the local cache directory update may be mirrored to a port 130 used to communicate with controller 102. Controller 102 may then send one or more indications of the cache directory update to the backup programmable switch 104 or switches 104. This arrangement of sending the cache directory update first to controller 102 can help ensure that global cache directory is updated first, and as discussed in more detail below, can help ensure that each of the backup programmable switches 104 represent the same version of the cache directory by using controller 102 as a centralized leader.

In the case of a write request, egress pipeline 40 may use one or more of egress stages $40_1$ and $40_2$ to identify other nodes or devices in system 100 storing a copy of the requested cache line or lines and a status or permission level for the requested data. In such examples, egress pipeline 40 may also send cache line requests to the other nodes or devices to change a status or permission level of such other nodes. For example, a request to modify a cache line that is being shared by multiple nodes in addition to the memory device 110 storing the cache line can result in egress pipeline 40 sending cache line requests to the other nodes to change their permission level from shared to invalid for the cache line requested from memory device 110.

As will be appreciated by those of ordinary skill in the art with reference to the present disclosure, other arrangements of operations performed by programmable switch 104 are possible than those shown in the example of FIG. 3B. For example, some implementations may include creating new entries in cache directory 12 for cache lines received from memory device 110 or routing of cache lines to client devices 114. As another example variation, egress pipeline 40 may also send an indication of a cache directory update to a backup programmable switch in addition to controller 102, or may send a request for one or more additional cache lines as part of a prefetch operation, as described in more detail in co-pending application Ser. No. 16/548,116 incorporated by reference above.

Figure 4:
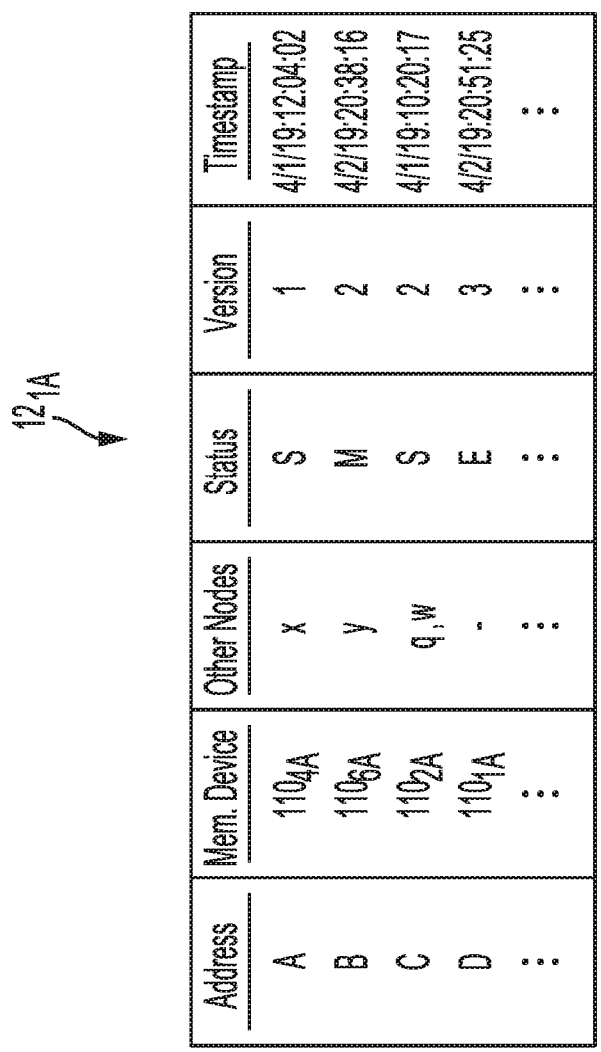
FIG. 4 provides an example cache directory according to one or more embodiments.

FIG. 4 provides an example of cache directory $12_{1A}$ maintained by programmable switch $104_{1A}$ of FIG. 1 according to one or more embodiments. In the example of FIG. 4, cache directory $12_{1A}$ may be a single data structure or may be formed of multiple data structures stored at programmable switch $104_{1A}$, which may include a memory directly connected to and used by programmable switch $104_{1A}$ (e.g., memory $134_{1A}$ in FIG. 2). As discussed above, at least one backup cache directory (e.g., backup cache directories $12_{2A}$ and $12_{3A}$ in FIG. 1) is stored at another programmable switch 104 for the same server rack 101 (e.g., backup programmable switches $104_{2A}$ and $104_{3A}$ in FIG. 1), as well as the cache directory information stored at controller 102 as part of global cache directory 20.

As shown in FIG. 4, cache directory $12_{1A}$ stored at programmable switch $104_{1A}$ includes addresses for different cache lines stored in memory devices 110 in communication with programmable switch $104_{1A}$ (e.g., memory devices $110_{1A}$ to $110_{6A}$ in FIG. 1). For each address or entry in cache directory $12_{1A}$, the memory device 110 storing the corresponding cache line is indicated, in addition to an indication of other nodes or devices that store a copy of the cache line, a status for the cache lines, a version number for the cache line, and a timestamp for when the cache line was last modified or authorized to be modified by its home memory device 110.

With reference to the example of FIG. 1, programmable switches 104 can maintain cache directories 12 to perform cache coherence operations, keep track of cache lines' states, and serve cache requests based on the stored memory addresses' states, which may, for example be stored in an on-chip SRAM memory. To cope with on-chip memory limitations, programmable switches 104 may only keep track of the active client devices 114 during runtime. A cache directory module of the switch's data plane 106 may only store the cache lines' states of active client devices 114. In this regard, each active client device 114 in a rack connected to a programmable switch 104 can be assigned a logical identifier during runtime. This can reduce the number of bits required to store the sharer and coherence state information in cache directory 12. In some implementations, the logical identifiers may also be used for performing match-action operations at the programmable switch 104 in routing cache line requests or other messages.

Each programmable switch 104 may keep a mapping table, such as a TCAM table, to translate the physical client device identifier to a logical identifier and vice-versa. This table can be reconfigured and updated during runtime to add new shares or to remove information about inactive client devices 114 according to the actively shared cache lines. This framework leverages the programmability of the switch pipelines to serve the cache coherence requests based on the coherence states.

The logical identifiers may be calculated or determined in various ways. In one example implementation, programmable switch 104 can perform a hashing on a number of identifiers for the client device 114, such as its MAC address, IP address, and port number, and then determine a logical identifier with a lower number of bits based on the hashing.

In another example implementation, programmable switches 104 and client devices 114 may be assigned location-based identifiers during a topology discovery process by exchanging, for example, Link Layer Discovery Protocol (LLDP) messages. The logical identifiers may then be formatted as an encoded location with respect to a hierarchical level of the programmable switch 104 or client device 114 in a multi-rooted tree topology of the data center's network. For example, individual bytes in a logical identifier from left to right could indicate a core switch identity, a domain identifier (e.g., a port number of the core switch through which a programmable switch 104 is connected), a host identifier (e.g., a port number of the programmable switch port through which the client device 114 is connected), and a local client device identifier. A logical identifier may be represented as, for example, 2.3.8.11. As the LLDP messages move from core switches towards the client device 114 during the topology discovery process, they will carry the information regarding the traveled nodes in order to enable nodes to setup their flow entries in TCAM tables, for example.

In the example of FIG. 4, programmable switch $104_{1A}$ determines logical identifiers x, y, q, and w for respective active client devices 114 that have requested cache lines. A shorter logical address (e.g., x, y, q, or w in FIG. 4) can be used in place of a longer address or identifier for the active client devices 114. In some implementations, programmable switch $104_{1A}$ can maintain a mapping, such as with use of a CAM or TCAM match-action table, between the determined logical addresses and the full address or identifier used for the active client devices 114. This can allow programmable switch $104_{1A}$ to reduce the storage size or amount of memory at programmable switch $104_{1A}$ needed to store cache directory $12_{1A}$. The use of logical identifiers for active nodes or client devices 114 can be especially useful in cases where only a relatively small subset of a large number of client devices 114 accesses multiple cache lines represented by cache directory $12_{1A}$.

In addition, programmable switch $104_{1A}$ may limit the coherence domain or limit the tracking of permission levels or states of only the active client devices 114 that may be located in server rack $101_A$. In such implementations, programmable switch $104_{1A}$ may determine and assign logical identifiers for active client devices that have received cache lines and retain a permission level with respect to the cache lines.

When the active client devices 114 have released or relinquished all of their permission levels for cache lines, as discussed in more detail below with the examples of FIG. 5C, the client devices 114 become inactive. Programmable switch $104_{1A}$ may then remove the logical identifiers for such inactive client devices 114 from cache directory $12_{1A}$.

In some cases, an address or other indicator of the memory device 110 storing the cache line may be included as part of the address for the cache line. As shown in the example of FIG. 4, a copy of the cache lines corresponding to addresses A and B are stored at the active client devices 114 assigned logical identifiers x and y, respectively, in addition to the main cache lines for addresses A and B, which are stored at memory devices $110_{4A}$ and $110_{6A}$, respectively. The status for the cache line indicated by address A is shared (i.e., S in FIG. 4), meaning that the client device 114 represented by logical identifier x has read-only access that can be shared with other nodes. In addition, the version number of 1 for the cache line corresponding to address A indicates that it has not been modified since it was originally stored in memory device $110_{4A}$ at a particular time indicated by the timestamp.

In this regard, different devices in a system implementing a distributed cache may not be exactly synchronized with each other. In some implementations, this challenge is overcome by using the time provided by the home memory device 110 that stores the requested data. Programmable switch $104_{1A}$ may receive this time in a cache message from memory device 110 with the requested data. The use of the home memory device 110 that stores the requested data as the serialization point or timekeeper for the requested data can provide a consistent timestamp for the requested data and allow for scalability of the distributed cache without having to synchronize timekeeping among an increasing number of devices at a central location. In other implementations, the timestamp may instead be determined by programmable switch $104_{1A}$.

The latest timestamp of a cache directory 12 may be used as a timestamp representing the current version of the cache directory 12. In other implementations, a separate field may be used in cache directory 12 for a version number or timestamp representing the state of the cache directory as a whole. As discussed in more detail below with reference to the sequence diagram of FIG. 10, controller 102 may request the timestamps of the backup cache directories 12 from the backup programmable switches 104 to determine a new timestamp indicating a later version than the received timestamps. Controller 102 may then use this new timestamp to update the version of the backup cache directories 12 and to update global cache directory 20 when sending an indication of a cache directory update made by the primary programmable switch $104_1$. This can allow the backup cache directories 12 at the backup programmable switches 104 to remain consistent with the global cache directory 20 at controller 102, which is updated in response to indications of cache directory updates received from the primary programmable switch $104_1$.

In the example of cache directory $12_{1A}$ in FIG. 4, the status of the cache line indicated by address B is modified (i.e., M in FIG. 4), meaning that client device 114 represented by logical identifier y has write access to the cache line. The version number of 2 for the cache line indicates that it has been modified twice since it was originally stored in memory device $110_{6A}$ at the time indicated by the timestamp for the cache line.

The cache line indicated by address C in cache directory $12_{1A}$ is stored in memory device 1102A, and has shared read-only copies of the cache line stored at the client devices 114 assigned logical identifiers q and w. The cache line has been modified twice since it was originally stored in memory device 1102A, and was last modified or authorized to be modified by its home memory device 1102A at the time indicated by the corresponding timestamp in cache directory $12_{1A}$.

As shown in FIG. 4, the cache line indicated by address C is stored in memory device $110_{1A}$ with no copies at other nodes or devices. Memory device $110_{1A}$ has exclusive access or permission (i.e., status of E in FIG. 4) to modify the cache line, which has been modified three times since being originally stored in memory device $110_{1A}$, as indicated by its version number of 3. The last modification or authorization for modification is provided by the timestamp for the cache line indicated by address C.

As will be appreciated by those of ordinary skill in the art in light of the present disclosure, cache directory $12_{1A}$ may include different information than shown in FIG. 4. For example, some implementations of cache directory $12_{1A}$ may include usage statistics for different cache lines or may not include version numbers, or a separate indication of the memory device storing the cache line since this may be indicated by the address for the cache line. In some implementations, the status in cache directory $12_{1A}$ may only indicate whether a modification of the cache line is in progress, as opposed to a shared, modified, or exclusive status. As another example variation, different cache lines with contiguous addresses may be consolidated in cache directory $12_{1A}$ by representing the cache lines as a range of addresses, so long as the respective information (e.g., memory device location, other nodes, status, version number, and timestamp) remain the same for all cache lines in the address range.

Figure 5A:
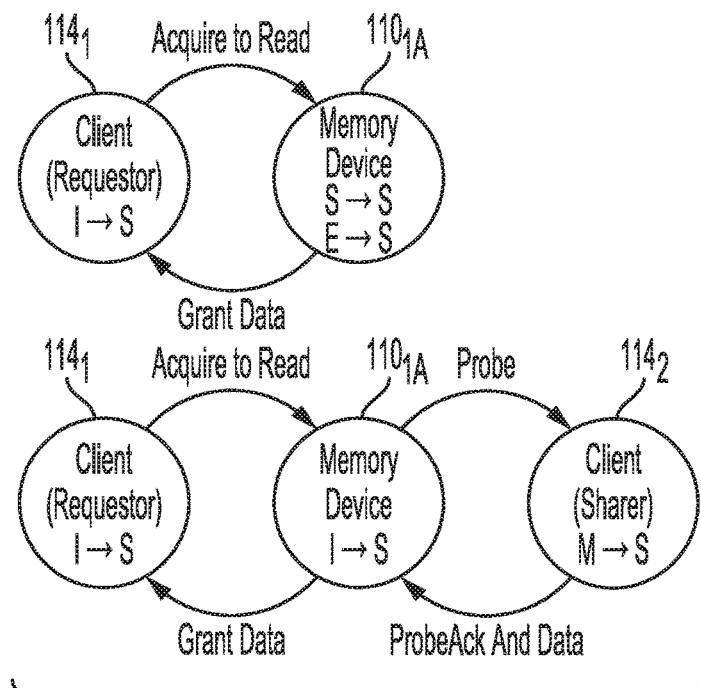
FIG. 5A provides state diagrams for the acquisition of a cache line to be read by a client according to one or more embodiments.
Figure 5B:
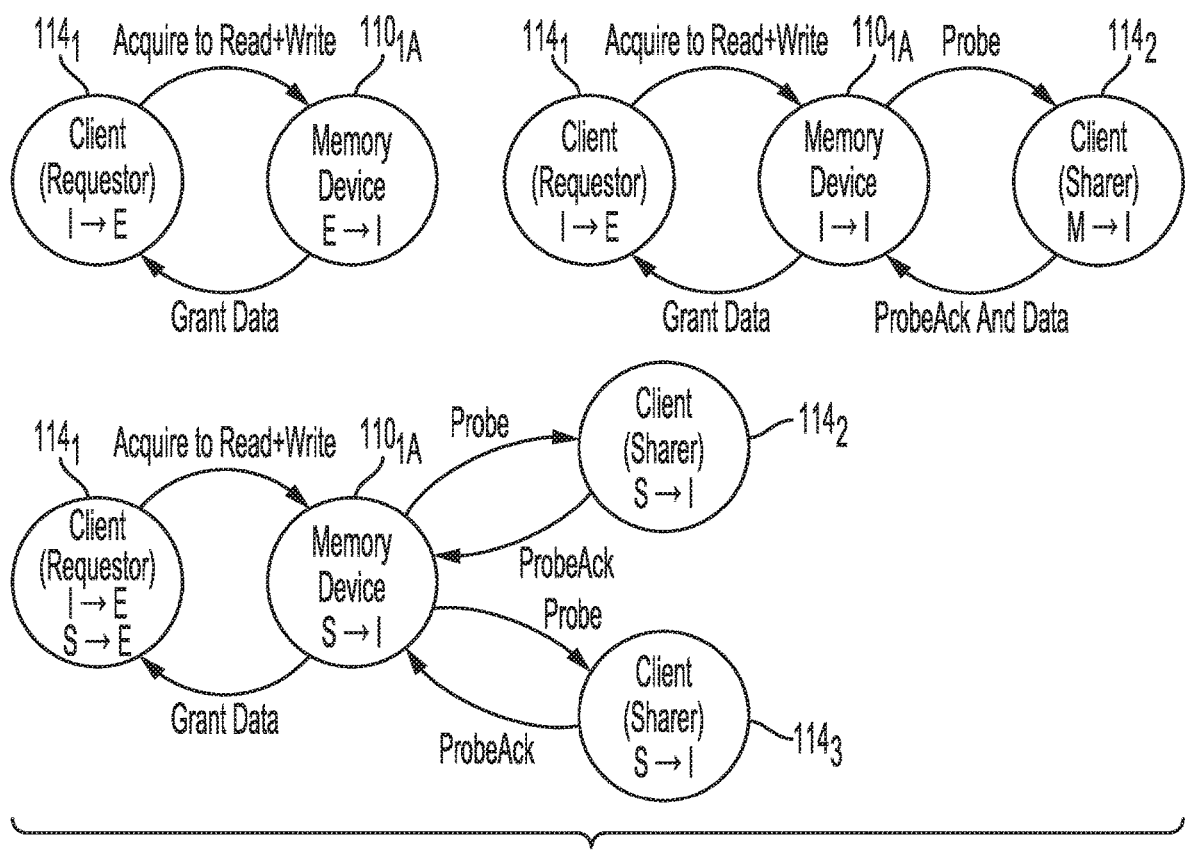
FIG. 5B provides state diagrams for the acquisition of a cache line to be written by a client according to one or more embodiments.
Figure 5C:
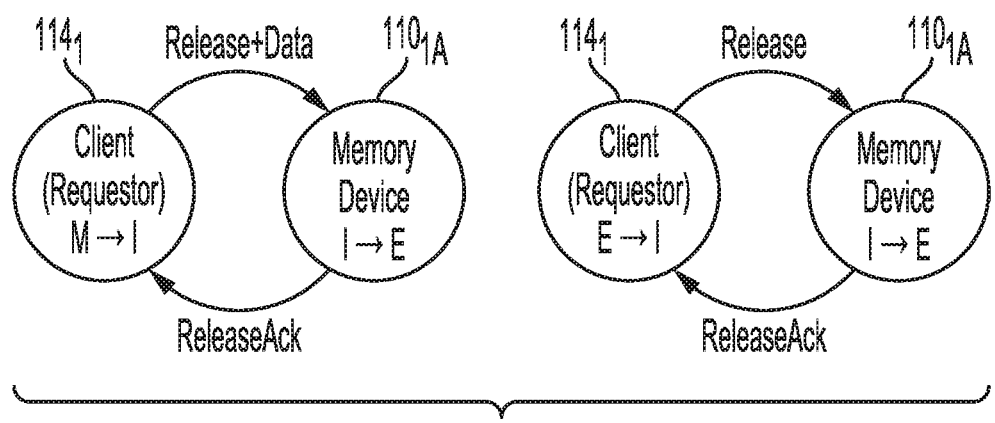
FIG. 5C provides state diagrams for the release of a permission level from a client according to one or more embodiments.

FIGS. 5A to 5C provide example state diagrams for maintaining the coherency of cache lines across the distributed cache. As discussed below with reference to FIGS. 6A to 6C, cache line requests may follow a packet format including one or more fields indicating a permission level requested by a client to perform an operation using the requested cache data.

FIG. 5A illustrates the acquisition of one or more cache lines to be read by a client device according to one or more embodiments. As shown in the top half of FIG. 5A, client device $114_1$ serves as a requestor that sends a cache line request to acquire one or more cache lines to read from memory device $110_{1A}$. As discussed in more detail below, the intended operation of client device $114_1$ on the requested data can be provided with the packet as part of the request using a packet header such as the header fields described below for FIGS. 6A to 6C. Client device $114_1$ may implement the packet header processing operation using distributed cache module $16_1$ executed by processor $116_1$.

In FIG. 5A, the permission level or status of client device $114_1$ with respect to the requested data changes from an invalid state to a shared state. This is shown in FIG. 5A with the permission level of client device $114_1$ with respect to the requested cache line changing from I to S after memory device $110_1$ has granted the request and provided the requested data to client device $114_1$ through a programmable switch, such as programmable switch $104_{1A}$. Client device $114_1$ may implement the change in permission level using distributed cache module $16_1$ executed by processor $116_1$.

For its part, memory device $110_{1A}$ receives the cache line request from client device $114_1$ and either maintains a shared permission level (i.e., S in memory device $110_1$) with respect to the requested data or changes its permission level with respect to the requested data from exclusive to shared (i.e., E to S in FIG. 5A) to indicate that memory device $110_{1A}$ is no longer the only node that has read and write permission for the requested data. The shared state indicates that the node has read-only permission to the data, that the data is valid and clean (i.e., does not have a more recent modified version at another device), and that other nodes or devices may also have a read-only copy of the data. The exclusive state also indicates that the requested data is valid and clean, but that the node or device is the only node in system 100 that has read and write permission to the data. Memory device $110_{1A}$ may implement the change in permission level using cache memory module $30_{1A}$ executed by controller $136_{1A}$.

In the bottom half of FIG. 5A, memory device $110_{1A}$ has an initial state of invalid for the requested data, meaning that memory device $110_{1A}$ does not have permission to read or modify the requested data. In response to receiving a cache line request from client device $114_1$ via programmable switch $104_{1A}$ to acquire one or more cache lines to read, memory device $110_{1A}$ probes client device $114_2$, which has modified the requested data. The probe from memory device $110_{1A}$ forces a change in the permission level of client device $114_2$ with respect to the requested data. Specifically, the state of client device $114_2$ with respect to the requested cache line or lines changes from modified to shared (i.e., M to S in FIG. 5A) to relinquish permission to the requested data. Client device $114_2$ sends the modified version of the data back to memory device $110_{1A}$ with an acknowledgement of the probe. Memory device $110_{1A}$ then provides client device $114_1$ with the requested data and permission to read the data. In response, client device $114_1$ changes its status with respect to the requested cache line from invalid to shared (i.e., I to S in FIG. 5A).

As noted above, the present disclosure uses programmable switch 104 to maintain the cache directory 12 for its respective memory devices 110. This ordinarily provides an efficient way to maintain cache directories 12 for the distributed cache, since programmable switch 104 serves as an intermediary or centralized location for communication between client devices 114 and its memory devices 110. Programmable switch 104 can update its cache directory 12 based on the cache line requests it receives for memory devices 110 without having to coordinate among a larger number of caches located at a greater number of client devices 114 or memory devices 110. Using programmable switch 104 to update a local cache directory also improves scalability of the distributed cache, since, in certain implementations, each programmable switch is responsible for only the cache lines stored in its associated set of memory devices 110.

In addition, controller 102 serves as a centralized location for initiating the update of backup cache directories 12 stored at backup programmable switches for racks 101. This ordinarily improves consistency among global cache directory 20 and the backup cache directories 12 in case a primary programmable switch $104_1$ fails or otherwise becomes unavailable.

FIG. 5B provides example state diagrams for when client device $114_1$ requests one or more cache lines to be modified. In the top left example state diagram of FIG. 5B, client device $114_1$ as the requestor requests data from memory device $110_{1A}$ for both reading and writing. Memory device $110_{1A}$, which has the only copy of the requested cache line or lines, changes its status with respect to the requested data from exclusive to invalid (i.e., E to I in FIG. 5B), and provides the requested data to client device $114_1$. Client device $114_1$ changes its status with respect to the requested data from invalid to exclusive to indicate that it is the only node with permission to write or modify the requested data.

The top right example state diagram of FIG. 5B illustrates a case where memory device $110_{1A}$ does not have the current copy of the requested data. When memory device $110_{1A}$ receives the request from client device $114_1$ to read and write to the requested data, memory device $110_{1A}$ probes client device $114_2$ for the requested data, which forces the permission level of client device $114_2$ with respect to the requested data from modified to invalid (i.e., M to I in FIG. 5B). The modified or current version of the requested data is sent from client device $114_2$ to memory device $110_{1A}$ with a probe acknowledgment. Memory device $110_{1A}$ forwards the requested data back to client device $114_1$ and grants permission to modify the data. Client device $114_1$ then changes its status with respect to the requested data from invalid to exclusive (i.e., I to E in FIG. 5B) to indicate that it is the only node with permission to modify the requested data.

The bottom example state diagram in FIG. 5B illustrates the case where client device $114_1$ requests data to modify that is being shared among client devices $114_2$ and $114_3$. Client device $114_1$ requests the data from memory device $110_{1A}$, which sends probes for the data to client devices $114_2$ and $114_3$ that are sharing copies of the requested data. In response, each of client devices $114_2$ and $114_3$ change their status from shared to invalid (i.e., S to I in FIG. 5B) for the requested data and send an acknowledgement back to memory device $110_{1A}$ that their permission level has been changed.

Memory device $110_{1A}$ then sends the requested data to client device $114_1$ and grants permission to client device $114_1$ to modify the data. The status of memory device $110_{1A}$ with respect to the requested data changes from shared to invalid, while the status of client device $114_1$ with respect to the requested data changes from either invalid to exclusive or shared to exclusive, depending on whether client device $114_1$ was previously sharing the data with client devices $114_2$ and $114_3$. In cases where client device $114_1$ already was sharing the requested data, memory device $110_{1A}$ may only send an indication that the permission level of client device $114_1$ can be changed from shared to exclusive, since client device $114_1$ already has a copy of the requested data.

FIG. 5C provides example state diagrams for the release of a permission level from client device $114_1$ according to one or more embodiments. As shown in the example state diagram on the left side of FIG. 5C, client device $114_1$ releases its permission level of modified data after writing to or modifying one or more cache lines by sending an indication of its completion of writing and a copy of the modified data to memory device $110_{1A}$. After receiving the modified cache line or cache lines, memory device $110_{1A}$ changes its permission level with respect to the data from invalid to exclusive and sends an indication of a release acknowledgment back to client device $114_1$. The status of client device $114_1$ with respect to the cache line is changed from modified to invalid to indicate that client device $114_1$ no longer has permission to modify or otherwise use the cache line.

In the example state diagram on the right side of FIG. 5C, client device $114_1$ instead changes its permission level with respect to one or more cache lines from exclusive to invalid. This can indicate that the cache line or cache lines may not have been modified by client device $114_1$, but that the permission level of client device $114_1$ has been changed to invalid so that another node, such as another client device 114, may modify the data. In this case, client device $114_1$ sends an indication of the release of its permission level to memory device $110_{1A}$, which sends a release acknowledgment back to client device $114_1$. Memory device $110_{1A}$ already has a current or valid copy of the data so there is no need for client device $114_1$ to send its copy of the data. Memory device $110_{1A}$ then changes its status with respect to the data from invalid to exclusive to indicate that it is the only node that has permission to modify the data.

As discussed above, memory device 110 in the foregoing examples serves as a serialization point for the modification of the data it stores. In other words, the order of performing requests for the same data is typically in the order that memory device 110 receives requests for the data. In addition, memory device 110 uses a non-blocking approach where cache line requests are granted in the order in which they are received. In some implementations, programmable switch 104 may delay additional requests received for data that is in progress of being modified and/or may send a request for a modified copy of the cache line to the client device 114 that has modified the data without having to wait for a request from memory device 110 to retrieve the modified data from the client device 114.

FIG. 6A depicts an example Ethernet packet format according to one or more embodiments. As shown in the example of FIG. 6A, the packet format fits into a standard 802.3 Layer 1 frame format, which can allow the packets to operate with existing and forthcoming programmable switches, such as a Barefoot Tofino ASIC switch, for example. The preamble, start frame delimiter, Medium Access Control (MAC) destination and source addresses, and interpacket gap follow the standard 802.3 Layer 1 frame format, but portions of the data payload in Layer 2 are replaced with coherence message fields of custom header 62 and cache request information 64 that can be parsed by programmable switch 104. Cache request information 64 may indicate a cache usage of a device, such as a client device 114 or memory device 110, as discussed in more detail in co-pending application Ser. No. 16/914,206, which is incorporated by reference above.

The payload of the example frame shown in FIG. 6A can include, for example, one or more cache lines that have been requested from a memory device 110 or one or more modified cache lines that are being flushed back to a memory device 110, in addition to custom header 62 and cache request information 64. In this regard, the payload can include, for example, an address or addresses for one or more cache lines that are requested from a memory device 110 or may include an address or addresses for one or more cache lines being returned to a client device 114 from a memory device 110 via a programmable switch 104. As discussed above with reference to FIGS. 3A and 3B, programmable ingress pipelines of a programmable switch 104 can identify cache line addresses included in the packet and perform match-actions to identify a memory device 110 storing the requested cache lines. In the example of FIG. 6A, the payload also includes a frame check sequence for ensuring the integrity of the data included in the payload. Such error checking may be performed by programmable switch 104, memory device 110, and/or client device 114 to help ensure that the received data is correct.

In some implementations, cache request information 64 may not be present in every cache message packet received by programmable switch. For example, client devices 114 and/or memory devices 110 may only send cache request information 64 at a particular interval, or when a particular condition is reached, such as when a queue of the client device 114 or memory device 110 reaches a threshold.

The Ethernet packet format in the example of FIG. 6A also includes priority indicator 60 as an 802.1Q tag. FIG. 6B depicts an example 802.1Q tag format for priority indicator 60. As shown in FIG. 6B, priority indicator 60 includes a tag protocol identifier, a Priority Code Point (PCP), a Drop Eligible Indicator (DEI), and a Virtual LAN Identifier (VLAN ID). The tag protocol identifier can indicate that that the packet includes an 802.1Q field. The PCP field can indicate the class of service. In the example of 802.1Q, the class of service can have one of eight values, which programmable switch 104 can use to determine a queue for the cache message. In some implementations, a second 802.1Q tag can be included in the packet format for cache messages to double the number of classes of service or priority values to sixteen.

In addition to the PCP field, the example of FIG. 6B also includes a DEI field. The DEI field can indicate whether the packet may be dropped when there is congestion or a traffic bottleneck, such as when a queue at programmable switch 104 becomes full or reaches a high threshold value. In such cases, programmable switch 104 may remove cache messages from the queue that indicate that such packets can be dropped based on the DEI for the packet. The example format of FIG. 6B also includes a VLAN ID, which may be used to indicate a virtual LAN to which the packet belongs. In the example of FIG. 1, each client device 114 and memory device 110 may use a particular value indicating membership in the distributed cache. In some implementations, the memory devices 110 of a particular rack 101 may have their own VID that may be a variant of a VID used for system 100 as a whole. The use of the VID, however, may be optional.

As discussed above, the priority indicator can be used by programmable switch 104 to determine a queue for the cache message among a plurality of queues for transmission via a particular port of programmable switch 104. In the example of FIG. 6A, the 802.1Q tag can provide eight different values for different classes of service. Client devices 114 may use these classes of service to associate cache messages from different applications that are responsible for the cache messages. In some implementations, this classification may be performed system wide with controller 102 informing client devices 114 of which applications should have a particular priority indicator value. In this regard, the priority indicators may be adjusted over time by controller 102, in conjunction with the distributed cache modules 16 and switch cache modules 26 executed at client devices 114 and programmable switches 104, respectively.

Additionally or alternatively, priority indicator 60 can be used to indicate different types of client devices 114. For example, different types of client devices 114 such as FPGAs, CPUs, GPUs, cores, or ASICs may be assigned a value for all of its priority indicators 60 or a range of values depending on the types of applications executed by the client device 114. The use of priority indicators across system 100 for the distributed cache can ordinarily allow for a more diverse or heterogenous use of different client devices 114, and a wider variety of applications that may have different demands on the distributed cache in terms of reliability, the rate of cache messages, and the size of message flows.

FIG. 6C depicts an example format for custom header 62 according to one or more embodiments. As discussed in more detail in related application Ser. No. 16/697,019 incorporated by reference above, the combination of fields in custom header 62 encodes information for coherence operations. A format field in header 62 can indicate a custom header type, such as by including a code indicating an OmniXtend or other custom header type. This format field may also indicate that the packet is for a cache message, as opposed to another type of message, such as to read or write data in units of a block size or page size, as opposed to a cache line size.

The OpCode field can indicate an operation type for an intended operation to be performed using a requested cache line or cache lines, such as an acquire to read or an acquire to read and write. In other cases, the OpCode field can indicate whether the packet is a probe to change the permission level of a client device 114 with respect to a cache line, or a probe acknowledgment to indicate that a permission level has been changed. In this regard, the parameter field of custom header 62 can indicate a current or requested permission level from the device sending the packet.

The size field of header 62 can indicate the size of the data requested (e.g., a number of cache lines or a size in bytes) or the size of the data provided in payload 32. The domain field in FIG. 6C can provide coherence message ordering guarantees within a subset of messages, and the source field can indicate a source identifier or other identifier for the device that issued the request. In this regard, the domain and/or source fields may be used by programmable switch 104 in some implementations to identify a cache message as belonging to a particular message flow.

As will be appreciated by those of ordinary skill in the art in light of the present disclosure, other message or packet formats can be used with programmable switches 104 for cache messages. For example, other implementations may include the priority indicator in the payload, as opposed to a separate 802.1Q tag, or may not include a priority indicator at all. Similarly, other implementations may not include cache request information 64.

Example Processes

Figure 7:
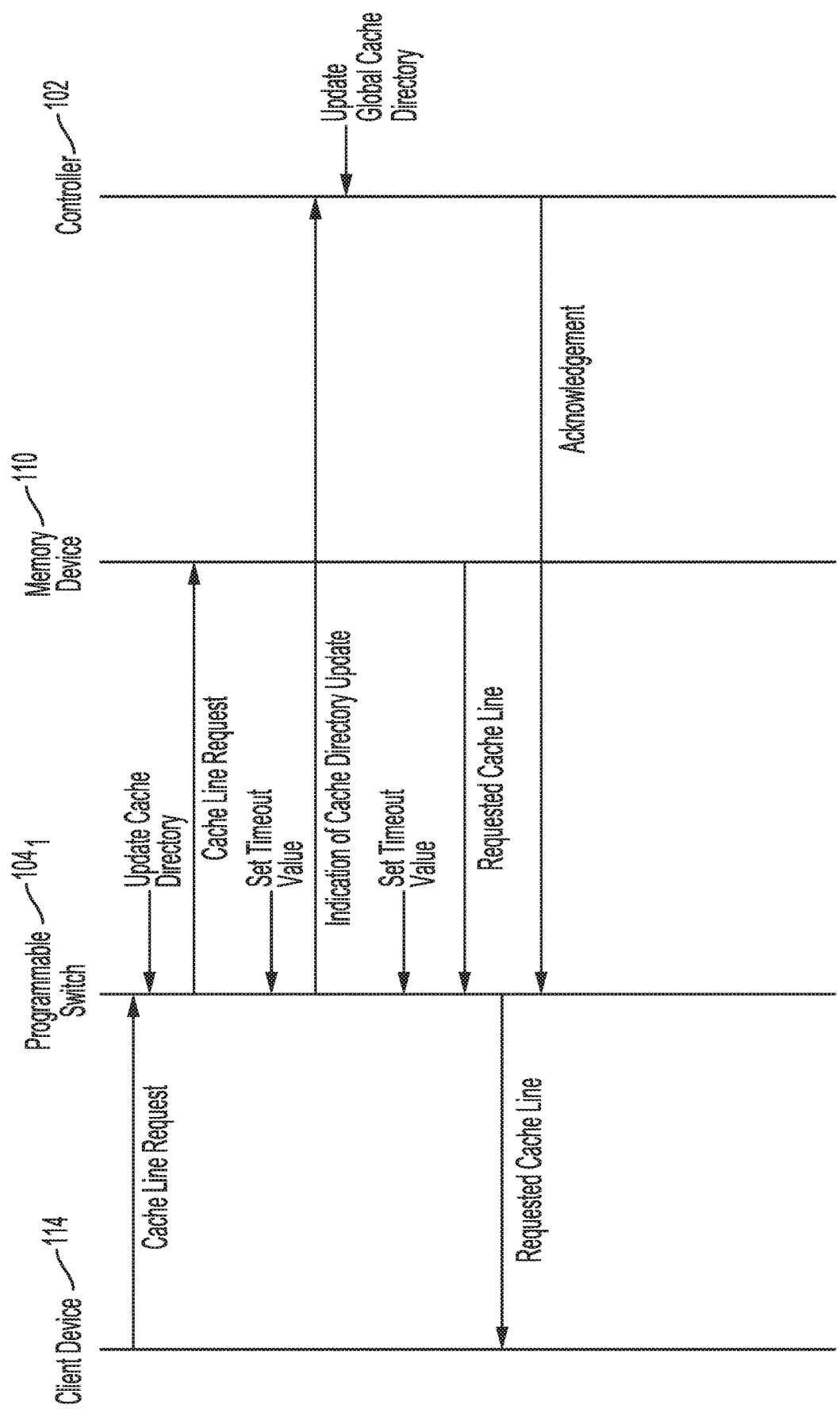
FIG. 7 is an example sequence diagram for cache line request handling according to one or more embodiments.

FIG. 7 is an example sequence diagram for cache line request handling according to one or more embodiments. As shown in FIG. 7, client device 114 sends a cache line request for one or more cache lines to primary programmable switch $104_1$. The primary programmable switch $104_1$ updates its cache directory $12_1$ based on the cache line request received from client device 114. In this regard, programmable switch $104_1$ acts as a primary programmable switch that stores a primary cache directory $12_1$ for the devices in its rack 101.

Programmable switch $104_1$ then sends the cache line request to memory device 110, which stores the cache line. Programmable switch $104_1$ also sets a timeout value for resending the cache line request. If the timeout value expires before receiving the requested cache line from memory device 110, programmable switch $104_1$ resends the cache line request to memory device 110. This can provide quick error detection and recovery to handle packet losses due to link failures and provide for more reliability. In some implementations, programmable switch 104₁ may use a timeout register for receiving the requested cache line or an acknowledgment of the cache line request by memory device 110. The timeout value can, for example, be based on a typical roundtrip packet duration between programmable switch 104₁ and memory device 110, and an expected processing time. The resending of a cache line request or other type of cache line message may be repeated in some implementations until an acknowledgment or the requested cache line is received, or for a predetermined number of attempts.

In the example of FIG. 7, programmable switch 104 sends to controller 102 an indication of the cache directory update made for the cache line request. Programmable switch 104₁ also sets a timeout value for resending the indication of the cache directory update. If the timeout value expires before receiving an acknowledgement of the sent indication of the cache directory update, programmable switch 104₁ resends the indication of the cache directory update to controller 102. This can ensure that global cache directory is updated, and help ensure that one or more backup cache directories 12 at one or more backup programmable switches 104 are also updated.

In some implementations, programmable switch 104₁ may use a timeout register for receiving the acknowledgment of the cache directory update from controller 102. The timeout value can, for example, be based on a typical or expected roundtrip packet duration between programmable switch 104₁ and controller 102, and an expected processing time. The resending of the indication of the cache directory update may be repeated in some implementations until an acknowledgment is received or for a predetermined number of attempts. In some implementations, programmable switch 104₁ may send the indication of the cache directory update to one or more backup programmable switches 104 in response to not receiving an acknowledgment from controller 102. In other implementations, programmable switch 104 may send the indication of the cache directory update to the one or more backup programmable switches 104 when sending the indication of the cache directory update to the controller.

Controller 102 updates global cache directory 20 based on the received indication of the cache directory update from programmable switch 104. As discussed in more detail below with reference to the sequence diagram of FIG. 10, controller 102 may determine a new timestamp for the cache directory update based on timestamps received from one or more backup programmable switches 104 so that the timestamps for the update in global cache directory 20 and/or in the backup cache directories 12 match.

In FIG. 7, programmable switch 104₁ receives the requested cache line from memory device 110 as a cache message. The requested cache line is sent to client device 114. The cache message from programmable switch 104₁ may also include a permission level for the requested cache line, as discussed above with reference to FIGS. 5A to 5C. Cache directory 12₁ stored at programmable switch 104₁ and global cache directory 20 stored at controller 102 may account for this permission level through the updates shown in FIG. 7, such as by indicating whether the requested cache line is in the progress of being modified by client device 114.

Figure 8:
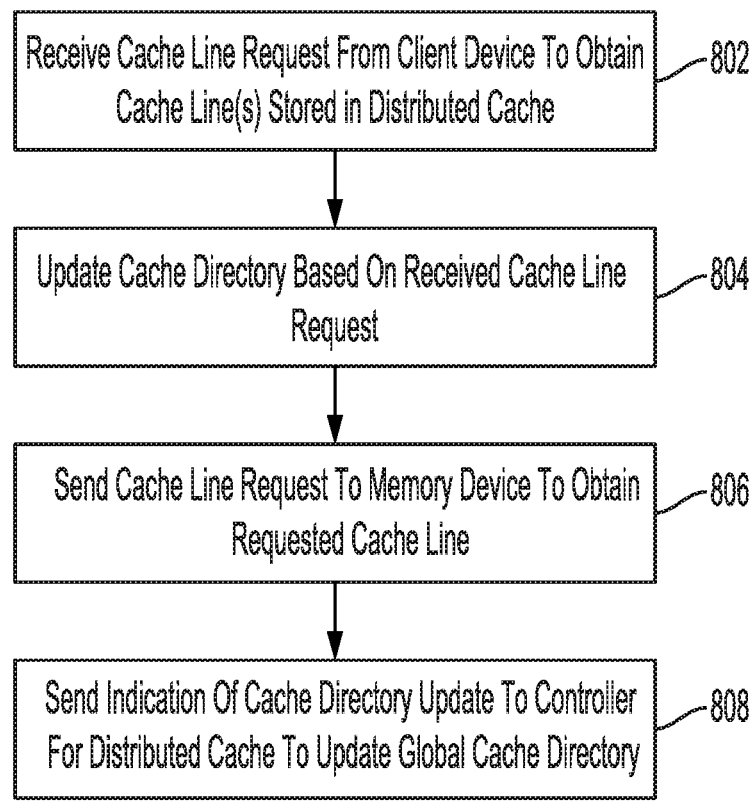
FIG. 8 is a flowchart for a cache directory update process according to one or more embodiments.

FIG. 8 is a flowchart for a cache directory update process according to one or more embodiments. The process of FIG. 8 may be performed by, for example, circuitry 132 of programmable switch 104 executing switch cache module 26.

In block 802, programmable switch 104 receives a cache line request to obtain one or more cache lines stored in the distributed cache. The cache line request may come from a client device 114 to perform an operation using the one or more requested cache lines, such as a read operation or a write operation.

In block 804, programmable switch 104 updates cache directory 12 based on the received cache line request. As discussed above with reference to the example of FIGS. 3A and 3B, an egress pipeline that processes the cache message to send to a memory device 110 may update cache directory 12 to indicate a change in a status of the requested cache line. In this regard, the centralized or in-line location of programmable switch 104 between client devices 114 and memory devices 110, and the use of fast match-action tables (e.g., CAM tables), can provide relatively quick updates to the localized cache directory 12 for the rack 101 corresponding to the programmable switch 104.

In block 806, programmable switch 104 sends the cache line request to a memory device 110 corresponding to an address indicated by the cache line request. As discussed in more detail in co-pending application Ser. No. 16/914,206 incorporated by reference above, traffic manager 38 of programmable switch 104 may identify a particular queue for queuing the cache line request based on a size of a message flow including the cache line request and/or based on a priority indicator for the cache line request. In addition, programmable switch 104 may also send additional cache line requests to prefetch additional cache lines predicted to be needed based on the received cache line request and additional prefetch information, as discussed in co-pending application Ser. No. 16/548,116.

In block 808, programmable switch 104 sends an indication of the cache directory update made in block 904 to controller 102 to update global cache directory 20. In some implementations, one or more egress stages of the egress pipeline of programmable switch 104 may mirror the cache directory update made to cache directory 12 as a cache message that is sent to controller 102. The indication of the update can include a timestamp associated with the update made to cache directory 12

Those of ordinary skill in the art will appreciate with reference to the present disclosure that the order of blocks for the cache directory update process of FIG. 8 may differ in other implementations. For example, in some implementations, programmable switch 104 may send the indication of the cache directory update to controller 102 in block 808 before sending the cache line request to memory device 110 in block 806. As another example variation, the update to the cache directory 12 may occur after receiving the requested one or more cache lines from memory device 110, as opposed to before sending the cache line request to memory device 110.

Figure 9:
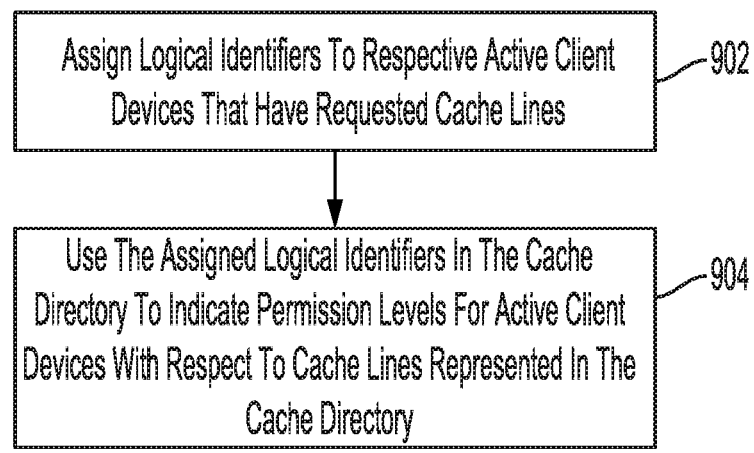
FIG. 9 is a flowchart for an active client logical identifier assignment process according to one or more embodiments.

FIG. 9 is a flowchart for an active client logical identifier assignment process according to one or more embodiments. The process of FIG. 9 may be performed by, for example, circuitry 132 of programmable switch 104 executing switch cache module 26.

In block 902, programmable switch 104 assigns logical identifiers to respective active client devices 114 that have requested one or more cache lines. As discussed above, the logical identifier may be determined by programmable switch 104 by, for example, performing a hashing on a number of identifiers for the client device 114, such as its MAC address, IP address, and/or port number. In other implementations, programmable switch 104 may determine the logical identifier for the client device 114 using an encoded location with respect to a hierarchical level of the client device 114 in a multi-rooted tree topology of the data center's network.

As discussed above with reference to the example of cache directory $12_{1A}$ in FIG. 4, the logical identifiers (e.g., x, y, q, and w in FIG. 4) may be used by programmable switch 104 to conserve storage space for cache directory 12 by replacing a longer address or other identifier for the client device 114 in and/or outside of the rack 101 corresponding to the programmable switch 104. In this regard, the storage space available at programmable switch 104 for storing cache directory 12 may be limited. In many cases, multiple cache lines may be requested by the same client device 114, such that the replacement of the address or identifier for the client device 114 in cache directory 12 can save storage space, even with an associated mapping between the full address or identifier for the client device 114 and the assigned logical identifier.

In block 904, programmable switch 104 uses the assigned logical identifier in cache directory 12 to indicate permission levels for active client devices with respect to the cache lines indicated in cache directory 12. When sending an indication of a cache line update to controller 102, as in the example of block 808 in the process of FIG. 8 discussed above, egress stages of programmable switch 104 may use the mapping between the full address or identifier for the client device 114 and its assigned logical identifier to include the full address or identifier for the client device 114 in the indication of the cache directory update sent to controller 102. In some implementations, the egress stages may also include the logical identifier currently assigned to the client device 114 in the indication of the cache directory update. This logical identifier may then be passed on to one or more backup programmable switches 104 for updating their backup cache directory 12 using the same logical identifier assigned by the primary programmable switch 104.

Programmable switch 104 may remove a logical identifier from cache directory 12 when the corresponding client device 114 releases all of its permission levels for the cache line or lines it previously requested.

Figure 10:
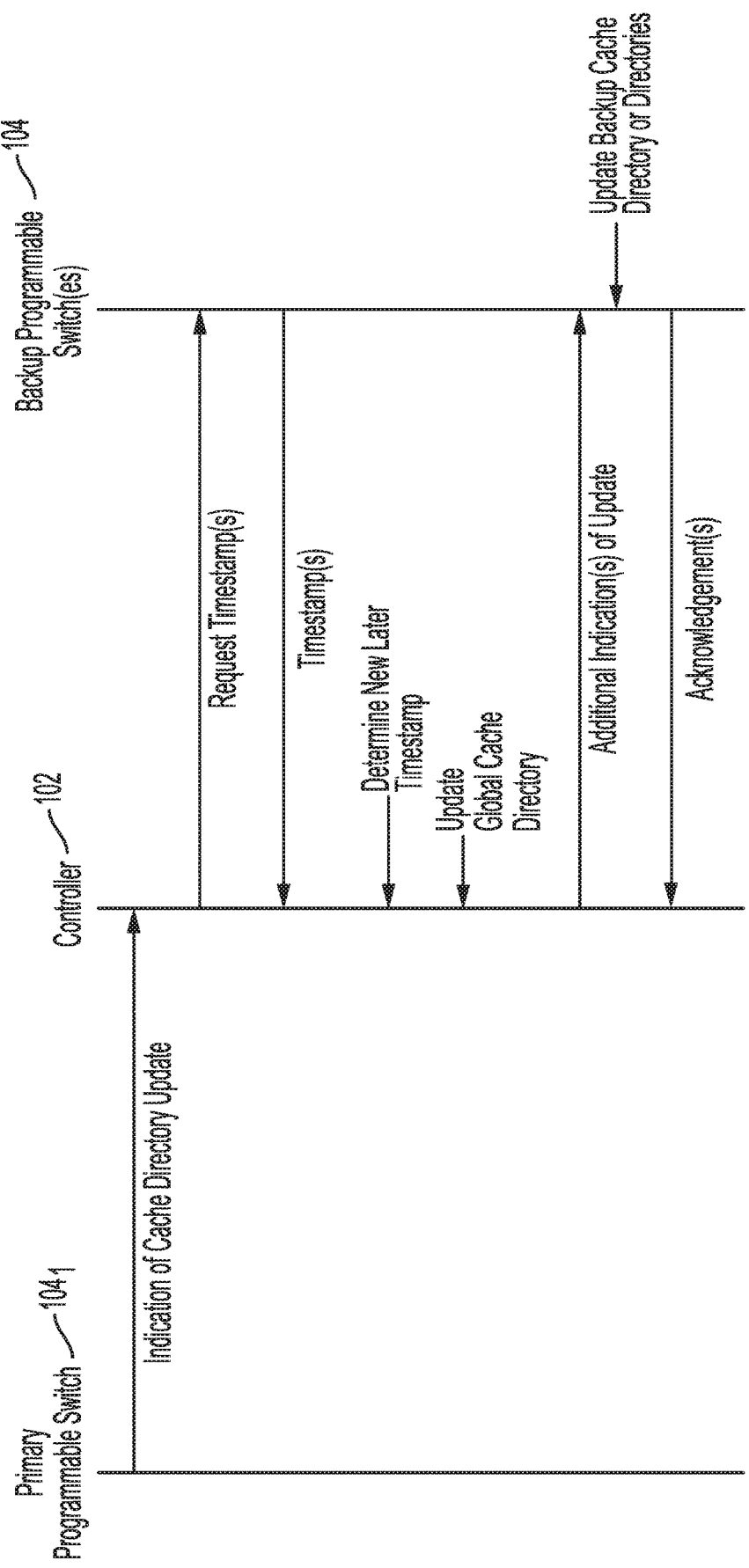
FIG. 10 is an example sequence diagram for cache coherency management according to one or more embodiments.

FIG. 10 is an example sequence diagram for cache coherency management according to one or more embodiments. The sequence of FIG. 10 may be performed to ensure consistency among global cache directory 20 stored at controller 102 and the backup programmable switches 104. As shown in FIG. 10, a primary programmable switch $104_1$ sends an indication of an update to its local cache directory $12_1$. The update to the cache directory may result from, for example, one or more cache lines requested by a client device 114 or the release of a permission level by a client device 114.

Controller 102 receives the indication of the cache directory update from the primary programmable switch $104_1$, and requests one or more timestamps from one or more respective backup programmable switches 104. The backup programmable switches 104 are backup switches that store backup cache directories 12 for the primary programmable switch $104_1$ that sent the indication of the cache directory update. Controller 102 may maintain a mapping or list of programmable switches for each rack 101 in system 100, and may use this information to send the timestamp requests to the backup programmable switches 104 for the particular rack served by the primary programmable switch $104_1$.

The backup programmable switches 104 may select a timestamp indicating a latest or most recent modification to their backup cache directories 12. In some cases, each cache line entry in the backup cache directory 12 may have its own timestamp, and the backup programmable switches 104 may use the most recent timestamp in responding to controller 102. In other cases, the entire backup cache directory 12 may have a timestamp or version number that is used in responding to controller 102.

After controller 102 has received the timestamps from backup programmable switches 104, controller 102 determines a new later timestamp. The later timestamp helps ensure consistency among backup programmable switches 104 such that an earlier timestamp is not used for updating the cache directories at backup programmable switches 104. In other implementations, controller 102 may determine the new timestamp after receiving the current timestamp from a majority of backup programmable switches 104. This can ordinarily improve the speed of the cache directory update process, such as when there are a larger number of backup programmable switches 104. In such implementations, controller 102 may use a greater offset from the latest timestamp as a protective measure against additional backup programmable switches 104 sending a later timestamp after determining the new timestamp.

In the example of FIG. 10, controller 102 determines the new later timestamp based on the timestamps received from backup programmable switches 104. This timestamp may then be used by controller 102 in updating global cache directory 20 based on the indication received from primary programmable switches 104. In this regard, the sequence of FIG. 10 may still be performed if there is only one backup programmable switch 104 to provide a consistent timestamp for the backup cache directory 12 and global cache directory 20 in such implementations.

Controller 102 also sends one or more additional indications of the cache directory update to backup programmable switches 104 with an indication of the new determined timestamp. When sending the indication of the cache directory update, controller 102 may also set a timeout value for receiving an acknowledgment back from each backup programmable switch 104. The timeout value may be set, for example, based on a roundtrip time to send messages to backup programmable switches 104 and processing time for backup programmable switches 104 to update their cache directories and send an acknowledgment. Controller 102 may resend the indication of the cache directory update to any backup programmable switches 104 that it does not receive an acknowledgment from before the expiration of the timeout value.

Backup programmable switches 104 update their respective backup cache directories 12 based on the received indication of the cache directory update from controller 102. The update can be made indicating the new timestamp determined by controller 102. As noted above, this new timestamp may be used for the particular cache line or cache lines for the update, or may be used for the backup cache directory 12 as a whole. Upon completing the update, each backup programmable switch 104 sends an acknowledgment of the cache directory update back to controller 102 to confirm that the cache directory update has been made.

Those of ordinary skill in the art will appreciate in light of the present disclosure that other implementations may differ from the example sequence shown in FIG. 10. For example, in some implementations the timestamp may instead be a version number or other indicator of the state of the cache directory 12. As another example variation, controller 102 may instead update global cache directory 20 before receiving timestamps from backup programmable switches 104, and then later update global cache directory 20 with the new timestamp determined from the received timestamps. As yet another example variation, controller 102 in some implementations may send the new determined timestamp to the primary programmable switch $104_1$ that sent the indication of the cache directory update so that the primary programmable switch $104_1$ can update its primary cache directory $12_1$ to indicate the new determined timestamp.

Figure 11:
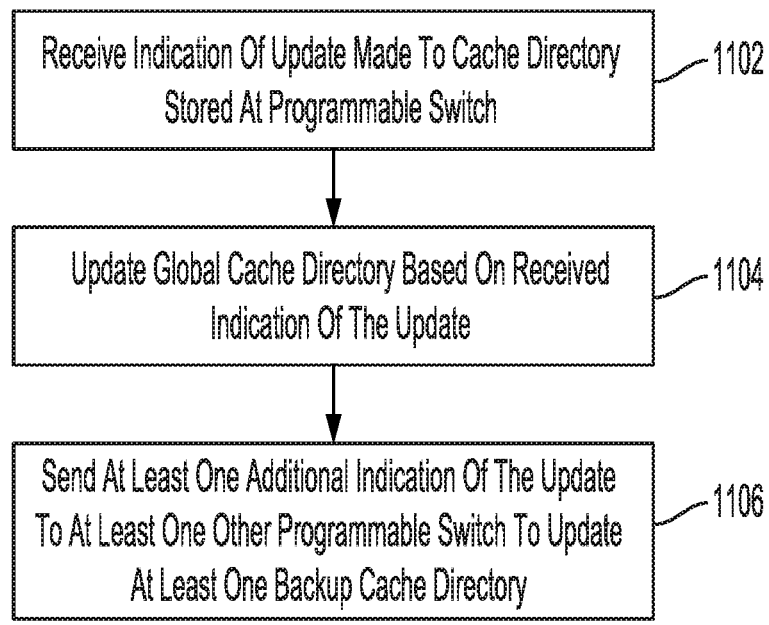
FIG. 11 is a flowchart for a global cache directory update process according to one or more embodiments.

FIG. 11 is a flowchart for a global cache directory update process according to one or more embodiments. The process of FIG. 11 can be performed by, for example, processor 124 of controller 102 executing cache controller module 22.

In block 1102, controller 102 receives an indication of an update made to a cache directory 12 stored at a programmable switch $104_1$ that is acting as a primary programmable switch for a collection of nodes (e.g., memory devices 110 and/or client devices 114 in a server rack 101). The update can include, for example, an update to add a new cache line to the cache directory, change the permission level for the cache line, change a node (e.g., a client device 114) that has access to the cache line, indicate a modification to the cache line, or change the storage location (e.g., the home node or memory device 110) storing the cache line. In some cases, the update to the cache directory can include a consolidation of entries for multiple cache lines that may have contiguous addresses.

In block 1104, controller 102 updates global cache directory 20 based on the received indication of the update to the cache directory 12. In some implementations, the update to global cache directory 20 may include the timestamp determination discussed above for the sequence diagram of FIG. 10 so that the update to global cache directory 20 reflects a later time than any backup programmable switches 104 that may be associated with the primary programmable switch $104_1$.

In block 1106, controller 102 sends at least one additional indication of the update to at least one other programmable switch 104 (e.g., backup programmable switches 104) to update at least one backup cache directory 12. In sending the at least one additional indication of the cache directory update, controller 102 may use a mapping or other data structure associating the primary programmable switch $104_1$ with its backup programmable switch or switches 104. Controller 102 may also use timeout values for receiving acknowledgments from the additional one or more programmable switches 104 to ensure that the backup cache directories 12 are updated. As discussed above, using a centralized controller, such as controller 102, to maintain consistency among the backup cache directories 12 can ordinarily provide a centralized Paxos-style leader to maintain consensus among the cache directories 12 and global cache directory 20.

Those of ordinary skill in the art will appreciate with reference to the present disclosure that the order of blocks in FIG. 11 may differ in other implementations. For example, in some implementations, controller 102 may send the at least one additional indication of the update to the at least one other programmable switch in block 1106 before updating global cache directory 20 in block 1104. In such implementations, the received indication of the update from a primary programmable switch $104_1$ in block 1102 may be mirrored to the backup programmable switch or switches 104.

Figure 12:
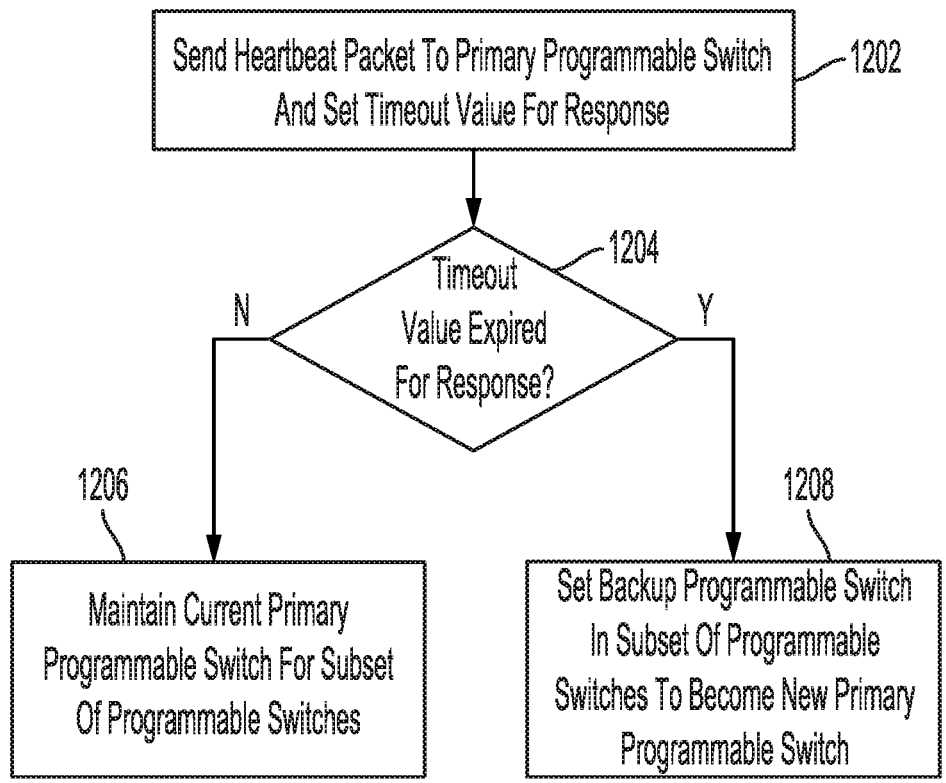
FIG. 12 is a flowchart for a primary programmable switch selection process according to one or more embodiments.

FIG. 12 is a flowchart for a primary programmable switch selection process according to one or more embodiments. The process of FIG. 12 can be performed by, for example, processor 124 of controller 102 executing cache controller module 22. The primary programmable switch selection process of FIG. 12 may be performed periodically to identify primary programmable switches that are not available, such as due to failure of the switch, and to select a replacement primary programmable switch. In some implementations, the process of FIG. 12 may be performed based on conditions, such as not having received an update from a primary programmable switch within a predetermined time period.

In block 1202, controller 102 sends a heartbeat packet to a primary programmable switch $104_1$, and sets a timeout value for receiving a response to the heartbeat packet. The heartbeat packet may be treated as a cache message or other type of message with an operation code or field in the packet indicating that a response is required from the primary programmable switch $104_1$.

In block 1204, controller 102 determines whether the timeout value expired before receiving the response from the primary programmable switch $104_1$. The timeout value may be based on a roundtrip time and processing that may be performed by the primary programmable switch $104_1$ in responding to the heartbeat packet.

If the timeout value does not expire in block 1204, controller 102 in block 1206 maintains the current primary programmable switch $104_1$ for the subset of programmable switches including the current primary programmable switch $104_1$ and its one or more backup programmable switches 104. In some implementations, the response to the heartbeat packet may only indicate that the heartbeat packet was received. In other implementations, the response to the heartbeat packet may include additional information from the primary programmable switch $104_1$, such as queue occupancy information or another indication of usage or traffic at the primary programmable switch $104_1$.

On the other hand, if controller 102 does not receive the response to the heartbeat packet from the primary programmable switch $104_1$ before expiration of the timeout value, controller 102 in block 1208 sets a backup programmable switch 104 in the subset of programmable switches 104 to become the new primary programmable switch 104. In setting the new primary programmable switch, controller 102 may send a specific code in a cache message or other type of message indicating that the backup programmable switch 104 is the new primary programmable switch. For its part, the new primary programmable switch may then send indications to each of the nodes in its rack 101, such as memory devices 110 and/or client devices 114 that messages are now routed through the new primary programmable switch 104. In addition, ports 130 of the new primary programmable switch 104 may be activated for communication on network 112.

The use of controller 102 to proactively identify possible failed or otherwise unavailable programmable switches 104 using heartbeat packets can ordinarily allow for a quick identification and replacement of such unavailable programmable switches. In addition, since the backup cache directories 12 of the backup programmable switches are updated in the background by controller 102, time does not need to be wasted updating the backup programmable switches 104. The backup cache directories 12 are therefore ready for use as soon as a new primary programmable switch is selected to replace a failed or otherwise unavailable programmable switch 104. Those of ordinary skill in the art will appreciate with reference to the present disclosure that variations of the process of FIG. 12 are possible. For example, controller 102 may also send heartbeat packets to backup programmable switches 104 to ensure that they are still available for use as backup programmable switches, and may update a mapping or list of backup programmable switches accordingly.

As discussed above, the foregoing use of a centralized controller to maintain a global cache directory and to update backup cache directories stored at backup programmable switches can improve the fault-tolerance and maintain a coherent system for large-scale distributed caches. In addition, the use of timeout values for receiving acknowledgments on cache directory updates can help ensure that cache directory updates are made to the global cache directory, and also to the backup cache directories. The use of logical identifiers for active client devices can also facilitate the storage of cache directories locally at programmable switches that can provide a quick update to the cache directories due to in-line processing and programmable match-action tables.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable switch configured to be on a network, comprising:
    at least one memory configured to store a cache directory for a distributed cache; and
    circuitry configured to:
        route cache messages between at least one client device on the network and a plurality of memory devices on the network;
        receive a cache line request from a client device on the network to obtain a cache line for performing an operation by the client device;
        update the cache directory stored in the at least one memory of the programmable switch based on the received cache line request;
        route the cache line request to a memory device on the network to obtain the requested cache line; and
        send an indication of the cache directory update to a controller for the distributed cache to update a global cache directory.

2. The programmable switch of claim 1, wherein the circuitry is further configured to:
    assign logical identifiers to respective active client devices that have requested cache lines; and
    use the assigned logical identifiers in the cache directory to indicate permission levels for the active client devices with respect to cache lines represented in the cache directory.

3. The programmable switch of claim 1, wherein the circuitry is further configured to update a timestamp for the cache directory when updating the cache directory based on the received cache line request.

4. The programmable switch of claim 1, wherein the circuitry is further configured to:
    set a timeout value for resending the indication of the cache directory update to the controller; and
    in response to not receiving an acknowledgment from the controller before expiration of the set timeout value, resend the indication of the cache directory update to the controller.

5. The programmable switch of claim 1, wherein the circuitry is further configured to:
    determine that the cache line is not represented in the cache directory;
    receive the requested cache line from the memory device; and
    update the cache directory after receiving the requested cache line from the memory device to include information representing the cache line.

6. The programmable switch of claim 1, wherein the circuitry is further configured to:
    receive a heartbeat packet from the controller; and in response to the received heartbeat packet, send an indication of a status of the programmable switch to the controller.

7. The programmable switch of claim 1, wherein the circuitry is further configured to:
receive a request from the controller for a timestamp indicating a version of the cache directory stored in the at least one memory; and
in response to the received request, send the timestamp to the controller indicating the version of the cache directory.

8. The programmable switch of claim 1, wherein the circuitry is further configured to receive one or more cache directory updates from the controller based on one or more indications of updates received by the controller from at least one other programmable switch.

9. A method for providing a distributed cache, the method comprising:
routing, by a programmable switch on a network, cache messages between at least one client device on the network and a plurality of memory devices on the network;
receiving, by the programmable switch, a cache line request from a client device on the network to obtain a cache line stored in the distributed cache;
updating a cache directory stored in the programmable switch based on the received cache line request;
routing the cache line request to a memory device on the network to retrieve the requested cache line; and
sending, by the programmable switch, an indication of the cache directory update to a controller on the network to update a global cache directory for the distributed cache.

10. The method of claim 9, wherein the cache directory represents information about cache lines of the distributed cache that are stored in memory devices that are in communication with the programmable switch.

11. The method of claim 9, further comprising:
assigning, by the programmable switch, logical identifiers to respective active client devices that have requested cache lines; and
using the assigned logical identifiers in the cache directory to indicate permission levels for the active client devices with respect to cache lines represented in the cache directory.

12. The method of claim 9, further comprising updating a timestamp for the cache directory when updating the cache directory based on the received cache line request.

13. The method of claim 9, further comprising:
setting a timeout value for resending the indication of the cache directory update to the controller; and
in response to not receiving an acknowledgment from the controller before expiration of the set timeout value, resending the indication of the cache directory update to the controller.

14. The method of claim 9, further comprising:
determining that the cache line is not represented in the cache directory;
receiving the requested cache line from the memory device; and
updating the cache directory after receiving the requested cache line from the memory device to include information representing the cache line.

15. The method of claim 9, further comprising:
receiving a heartbeat packet from the controller; and
in response to receiving the heartbeat packet, sending an indication of a status of the programmable switch to the controller.

16. The method of claim 9, further comprising:
receiving a request from the controller for a timestamp indicating a version of the cache directory stored in the programmable switch; and
in response to the received request, sending the timestamp to the controller indicating the version of the cache directory.

17. The method of claim 9, further comprising receiving one or more cache directory updates from the controller based on one or more indications of updates received by the controller from at least one other programmable switch.

18. A controller for a distributed cache, the controller comprising:
at least one memory storing a global cache directory for the distributed cache;
an interface configured to communicate with a plurality of programmable switches on a network; and
means for receiving an indication of an update made to a cache directory by a programmable switch of the plurality of programmable switches, wherein the programmable switch is configured to route cache messages between at least one client device on the network and a plurality of memory devices on the network, and wherein the cache directory is stored in the programmable switch;
means for updating the global cache directory based on the received indication of the update; and
means for sending at least one additional indication of the update to at least one other programmable switch of the plurality of programmable switches to update at least one backup cache directory stored at the at least one other programmable switch.

19. The controller of claim 18, further comprising means for:
sending a heartbeat packet to a primary programmable switch of the plurality of programmable switches, wherein the primary programmable switch is configured to update a cache directory stored at the primary programmable switch for a subset of memory devices for the distributed cache; and
in response to a timeout value expiring for a response from the primary programmable switch, setting a backup programmable switch to become a new primary programmable switch for the subset of memory devices.

20. The controller of claim 18, further comprising means for:
requesting a timestamp from each programmable switch of a subset of programmable switches that includes the programmable switch, the timestamp indicating a version of a respective cache directory stored at each programmable switch;
receiving the timestamps from the subset of programmable switches;
determining a new timestamp indicating a later version than the received timestamps; and
sending the new timestamp to the at least one other programmable switch for the at least one additional indication of the update.

21. The controller of claim 18, wherein the controller is a Software Defined Networking (SDN) controller.

22. The programmable switch of claim 1, wherein the circuitry is further configured to determine end-to-end routes for packets between devices on the network.

\* \* \* \* \*